(12) United States Patent
Debus et al.

(10) Patent No.: US 12,475,674 B2
(45) Date of Patent: Nov. 18, 2025

(54) MACHINE AND METHOD FOR PROCESSING EDGE PROFILE OF OPHTHALMIC LENS

(71) Applicant: Satisloh AG, Baar (CH)

(72) Inventors: Travis Debus, Charlottesville, VA (US); Michael Martinet, Charlottesville, VA (US); Christian Tuss, Wetzlar (DE); Helga Lindemann, Attendorn (DE); Matthias Lischka, Cologne (DE); Aljoscha Nico Hans Zigann, Lohmar (DE); Ralf Merhof, Wetzlar (DE)

(73) Assignee: SATISLOH AG, Baar (CH)

( * ) Notice: Subject to any disclaimer, the term of this patent is extended or adjusted under 35 U.S.C. 154(b) by 485 days.

(21) Appl. No.: 17/992,442

(22) Filed: Nov. 22, 2022

(65) Prior Publication Data

US 2023/0162469 A1    May 25, 2023

Related U.S. Application Data

(60) Provisional application No. 63/282,765, filed on Nov. 24, 2021.

(51) Int. Cl.
  *G06V 10/44* (2022.01)
  *B29D 11/00* (2006.01)
  (Continued)

(52) U.S. Cl.
  CPC ........ *G06V 10/44* (2022.01); *B29D 11/00865* (2013.01); *B29D 11/0098* (2013.01);
  (Continued)

(58) Field of Classification Search
  CPC .......... B29D 11/0098; B29D 11/00865; G06V 10/44; G06T 7/521
  See application file for complete search history.

(56) References Cited

U.S. PATENT DOCUMENTS 6,749,377 B2   6/2004  Gottschald et al.
8,411,288 B2   4/2013  Schneider et al.

FOREIGN PATENT DOCUMENTS

EP    0196114 A2   10/1986
EP    1238733 A1    9/2002
(Continued)

OTHER PUBLICATIONS

International Preliminary Report on Patentability dated Jun. 6, 2024 from related PCT Application No. PCT/US2022/050751.

*Primary Examiner* — Mathieu D Vargot
(74) *Attorney, Agent, or Firm* — CALDERON SAFRAN & WRIGHT P.C.

(57) ABSTRACT

A machine for processing an edge profile of an ophthalmic lens. The machine is defined by mutually perpendicular X, Y and Z axes. The machine comprises a machine frame, a lens holder unit for selectively holding the ophthalmic lens, a laser scanner unit for determining an edge profile of the ophthalmic lens mounted to the lens holder unit, and a main controller operatively connected to each of the lens holder unit and the laser scanner unit. The lens holder unit is configured to selectively rotate the ophthalmic lens around a C-axis of the lens holder unit, tilt the ophthalmic lens relative to the laser scanner unit and move rectilinearly relative to the machine frame in the directions of the Y axis. The laser scanner unit is selectively moveable rectilinearly relative to the machine frame in the directions of the X and Z axes.

34 Claims, 16 Drawing Sheets

(51) Int. Cl.
  *G01B 11/02*  (2006.01)
  *G02B 1/10*  (2015.01)
  *G02C 7/02*  (2006.01)
  *G06T 7/521*  (2017.01)

(52) U.S. Cl.
  CPC .............. *G01B 11/028* (2013.01); *G02B 1/10* (2013.01); *G02C 7/022* (2013.01); *G06T 7/521* (2017.01)

(56) References Cited

FOREIGN PATENT DOCUMENTS

| | | | |
|---|---|---|---|
| EP | 2048472 | A1 | 4/2009 |
| EP | 2554943 | A1 | 2/2013 |
| EP | 3796053 | A1 | 3/2021 |

MACHINE AND METHOD FOR PROCESSING EDGE PROFILE OF OPHTHALMIC LENS

CROSS-REFERENCE TO RELATED APPLICATION AND CLAIM TO PRIORITY

This application claims the benefit of U.S. Provisional Patent Application Ser. No. 63/282,765 filed Nov. 24, 2021 by Debus et al., which is incorporated herein by reference in its entirety and to which priority is claimed.

BACKGROUND OF THE INVENTION

1. Field of the Invention

The present invention relates to processing ophthalmic (or optical) lenses in general and, more particularly, to a device and process for detecting the exact location and 3D profile of an outer peripheral edge of an edged lens. As a result of the shape and dimensions of the edge/profile, an exact 3D representation of the outer peripheral edge profile is obtained to be used in subsequent processing steps, such as application of liquid to (or coating with a liquid) an outer peripheral profile of a finished optical lens.

2. Description of the Related Art

Typically, peripheral features are machined onto an ophthalmic (or eyeglass) lens for settling the ophthalmic lens in an eyeglass frame selected by an eyeglass wearer. Eyeglass frames may have a groove or a bevel or some other configuration for seating with the edged lens. Correspondingly, the periphery of the lens will be shaped to complement the frame, to allow the lens to seat with the frame. The term ophthalmic (or eyeglass) lens as used below, is an optical lens or lens blank for eyeglasses made of the usual materials, i.e., inorganic glass or plastics, such as polycarbonate, CR-39®, Spectralite®, etc., and with a circumferential (or outer) lens edge of any shape, which lens or lens blank may be machined or generated on an optically effective surface prior to machining of the lens edge.

The purpose of ophthalmic lens edge machining is to make the ophthalmic lens ready for insertion into an eyeglass frame. Consequently, the ophthalmic lens is provided, when viewed in plan, with a circumferential contour which is substantially complementary to the circumferential contour of the eyeglass frame. Also, it may be necessary, depending on the type of lens holder, to form a groove or bevel at the ophthalmic lens edge, which serves for securing the ophthalmic lens to the eyeglass frame. To ensure that the ophthalmic lens fits into the eyeglass frame after edge-machining, or to be able to determine the position of the groove or bevel on the ophthalmic lens edge, the edge of the ophthalmic lens is measured after a preliminary machining stage, which is then finalized taking account of the measured edge data, optionally with formation of the groove or bevel.

The ophthalmic lens edge or a portion thereof may be coated with at least one functional layer formed by a substance (such as UV curing polymer blend) that is applied in liquid form to the outer edge of the ophthalmic lens, is chemically cured or radiation-cured, and is integrally bonded with the eyeglass lens upon curing.

Currently there is no system known that is able to accurately provide all geometric data related to the 3D outer peripheral edge profile of an ophthalmic lens. There are two basic systems available in different styles and executions that provide part of the information obtained by the invention: probing/measuring system in lens edger and tracer system.

Probing/measuring in lens edger: Every patternless lens edger requires measuring the ophthalmic lens edge positions (front and back edge of the lens) at some point during the processing. This is necessary to be able to position bevel, groove, safety bevel, etc., correctly on the lens edge. Most edgers perform this measurement after the initial rough cut with a tactile (or mechanical contact) method illustrated in FIG. 1. The QM-X4 edger available from National Optronics implements such a technique. However, none of the edgers measures ophthalmic lenses with lens edge profiles different from just a flat edge. Additionally, only Z axial information is retrieved, for axial lens edge location the edgers rely on their CNC positions from cutting the ophthalmic lens in the roughing step.

Tracer: Tracers, such as the 4Tx tracer available from National Optronics, are configured to measure the shape of the eyeglass frame and/or the shape of original (or unfinished) ophthalmic lenses (dummy lens and pattern). Existing tracers are available with tactile systems using a stylus (as illustrated in FIGS. 2A and 2B) or an optical measuring system. While tactile tracers measure the frame itself wherever possible (such as the lens edges with V-Bevel) and only rely on a demo lens for rimless/groove edges, optical tracers use the demo lens for all lens edge types. If an eyeglass frame is measured, the obtained frame shape data can be two- or three-dimensional, depending on the make and model of the tracer. The 3rd dimension is related to the groove in the eyeglass frame, not the ophthalmic lens itself. If a demo lens is measured, the obtained shape data is most often two-dimensional, although some tracers are capable of providing axial data for the center of a bevel feature. Even if axial data is obtained from tracing a demo lens, this data does not include any information about the lens edge profile. Axial data is also of relatively low accuracy and is used only for calculating lens edge circumference. When tracing a beveled lens, radial data is only collected at the apex of the bevel of the lens edge profile, and no information about bevel shape (height, angle, etc.) is collected. When tracing a grooved shape of the lens edge profile, only the rimless shape is measured; no information about the groove (width, axial position, etc.) is collected.

Moreover, none of the existing systems provides an exact 3D edge profile of ophthalmic lenses. As described before, some of the information is available from the lens tracers, some from the measuring step in the lens edger, but the full 3D edge profile cannot be established with existing solutions. While one might attempt to calculate the full 3D profile of the final lens from edger tool and tool path data, this data is not commonly available. Further, even if it would be available, the accuracy is not sufficiently high given inaccuracies in the tool geometry descriptions, machine calibrations, and flexing of the lens while clamped in the edger and force is applied to the edge by the machining cutter during edging.

BRIEF SUMMARY OF THE INVENTION

According to a first aspect of the invention, a machine for processing an edge profile of an ophthalmic lens is disclosed. The ophthalmic lens includes first and second opposite optical surfaces, and an outer peripheral edge defined therebetween. The machine defines mutually perpendicular X, Y and Z axes. The machine includes a machine frame, and a lens holder unit for selectively holding the ophthalmic lens. A laser scanner unit is provided for determining a profile of the outer peripheral edge of the ophthalmic lens when mounted to the lens holder unit. A main controller is operatively connected to each of the lens holder unit and the laser scanner unit for controlling and operating the lens holder unit and the laser scanner unit. Each of the lens holder unit and the laser scanner unit are mounted to the machine frame. The lens holder unit is moveable relative to the machine frame between a home position in which the ophthalmic lens is held away from the laser scanner unit, and a working position in which the ophthalmic lens is positioned adjacent the laser scanner unit. The lens holder unit is configured to selectively rotate the ophthalmic lens around a C-axis of the lens holder unit, to tilt the ophthalmic lens relative to the laser scanner unit, and to move rectilinearly relative to the machine frame in the direction of the Y axis. The laser scanner unit is selectively moveable rectilinearly relative to the machine frame in the X and Z axes.

According to a second aspect of the invention, a method for processing an edge profile of an ophthalmic lens is disclosed. The ophthalmic lens includes first and second opposite optical surfaces, and a continuous outer peripheral edge defined therebetween. The method includes the steps of securing an ophthalmic lens to a lens holder unit. The lens is then positioned in a working position adjacent a laser scanner unit A laser scan is conducted by a lens scanner by the laser scanner unit. The laser scanning includes directing a diffused laser beam projected from the laser scanner unit onto an outer peripheral edge of an ophthalmic lens from the laser scanner unit, sensing a reflected laser beam from the outer peripheral edge by the laser scanner unit, and determining an edge profile of the outer peripheral edge of the ophthalmic lens.

Yet another aspect is a machine for application of liquid to an edge profile of an ophthalmic lens. The ophthalmic lens includes first and second opposite optical surfaces, and a continuous outer peripheral edge defined therebetween. The machine defines mutually perpendicular X, Y and Z axes. The machine includes a machine frame, a lens holder unit for selectively holding the ophthalmic lens, and a laser scanner unit for determining a profile of the outer peripheral edge of the ophthalmic lens mounted to the lens holder unit. A liquid dispensing unit is moveably mounted to the machine frame, and is configured to apply a liquid coating to at least a portion of the outer peripheral edge of an ophthalmic lens. A UV light curing unit is mounted to the machine frame, and is configured to cure the liquid applied to the outer peripheral edge of the ophthalmic lens based on the profile of the outer peripheral edge of the ophthalmic lens determined by the laser scanner unit. The machine further includes a main controller operatively connected to each of the lens holder unit, the laser scanner unit, the liquid dispensing unit and the UV light curing unit for controlling and operating the lens holder unit, the laser scanner unit, the liquid dispensing unit and the UV light curing unit. The lens holder unit is moveable relative to the machine frame between a home position in which the ophthalmic lens is held away from the laser scanner unit, and a working position in which the ophthalmic lens is positioned adjacent the laser scanner unit. The lens holder unit is configured to selectively rotate the ophthalmic lens around a C axis of the lens holder unit, to tilt the ophthalmic lens relative to the laser scanner unit around a B axis, and to move rectilinearly relative to the machine frame in the directions of the Y axis. The laser scanner unit selectively moveable rectilinearly relative to the machine frame in the X and Z axes.

Other aspects of the invention, including system, devices, methods, and the like which constitute parts of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed considering the accompanying drawings, in which like elements are given the same or analogous reference numerals. In these drawings.

DETAILED DESCRIPTION OF PREFERRED EMBODIMENTS

Figure 1:
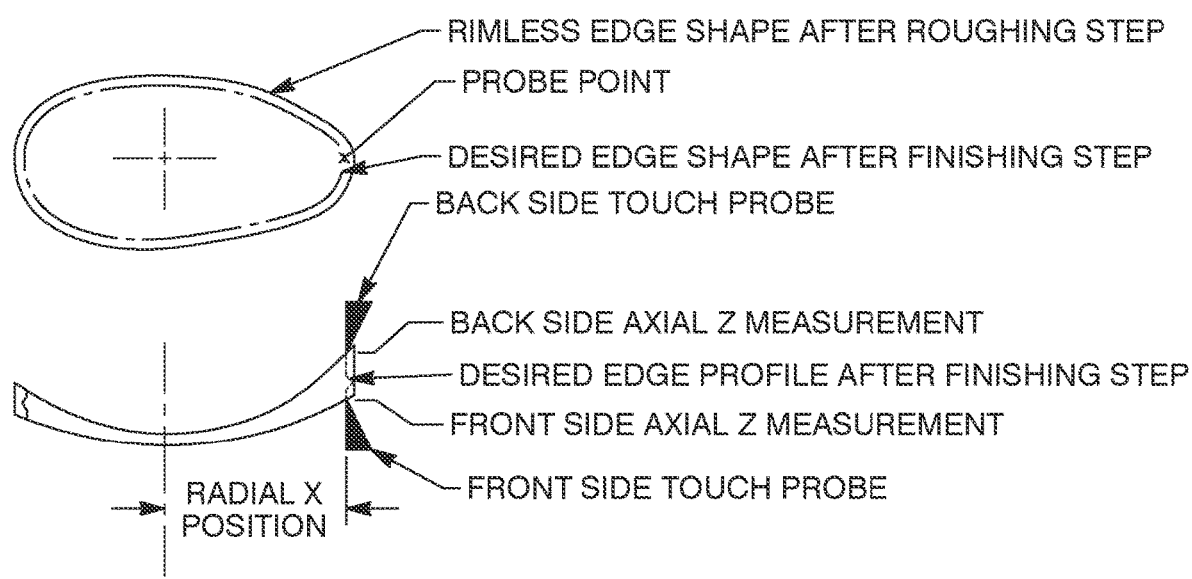
FIG. 1 illustrates a probing/measuring system in lens edger of the prior art.
Figure 2A:
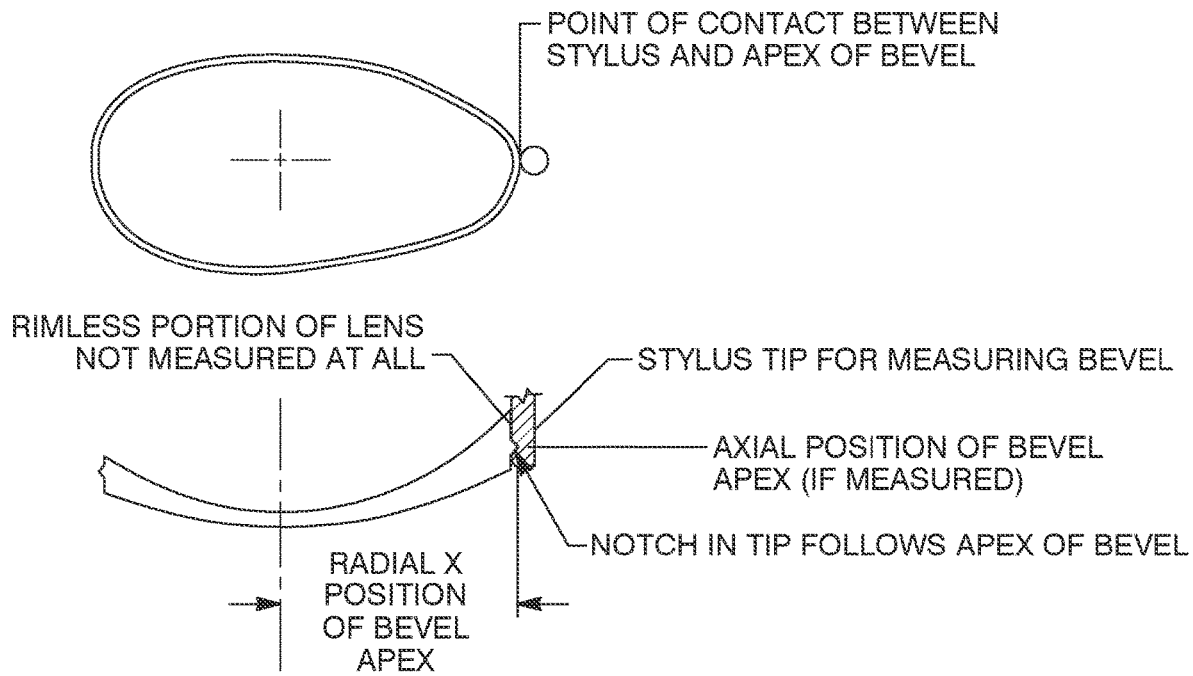
FIG. 2A illustrates a tracer system of the prior art for an ophthalmic lens with V-bevel.
Figure 2B:
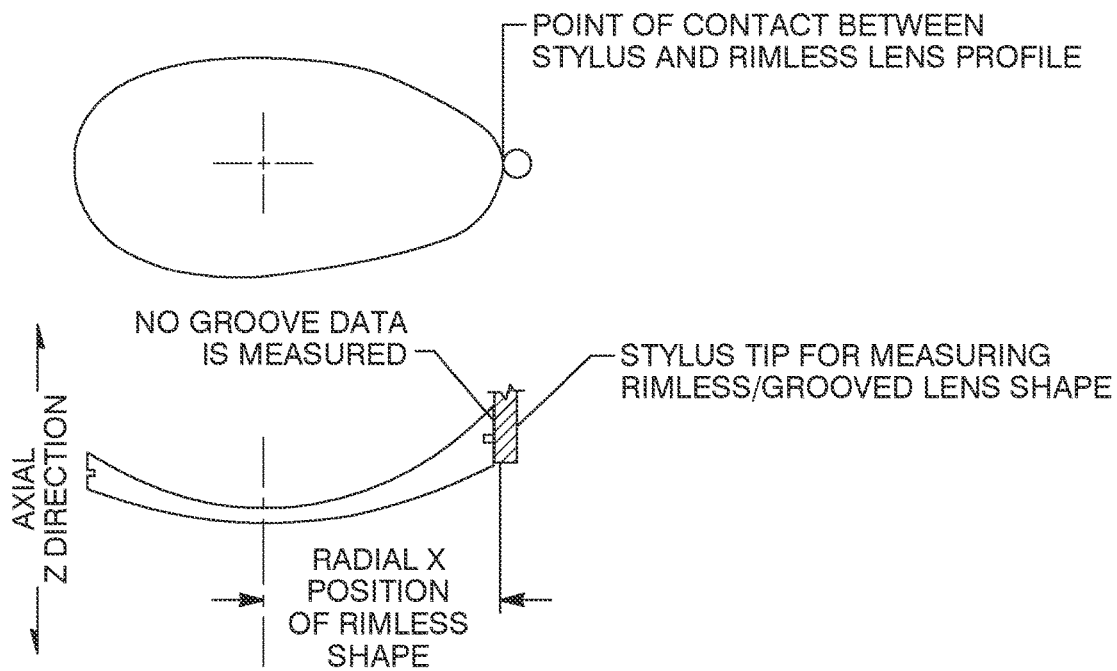
FIG. 2B illustrates a tracer system of the prior art for an ophthalmic lens with groove.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "inner" and "outer", "inside" and "outside," "horizontal" and "vertical," "front" and "rear," "upper" and "lower," "top" and "bottom" as well as derivatives thereof (e.g., "horizontally," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the words "a" and/or "an" as used in the claims mean "at least one" and the word "two" as used in the claims mean "at least two". For the purpose of clarity, some technical material that is known in the related art has not been described in detail in order to avoid unnecessarily obscuring the disclosure.

Figure 3:
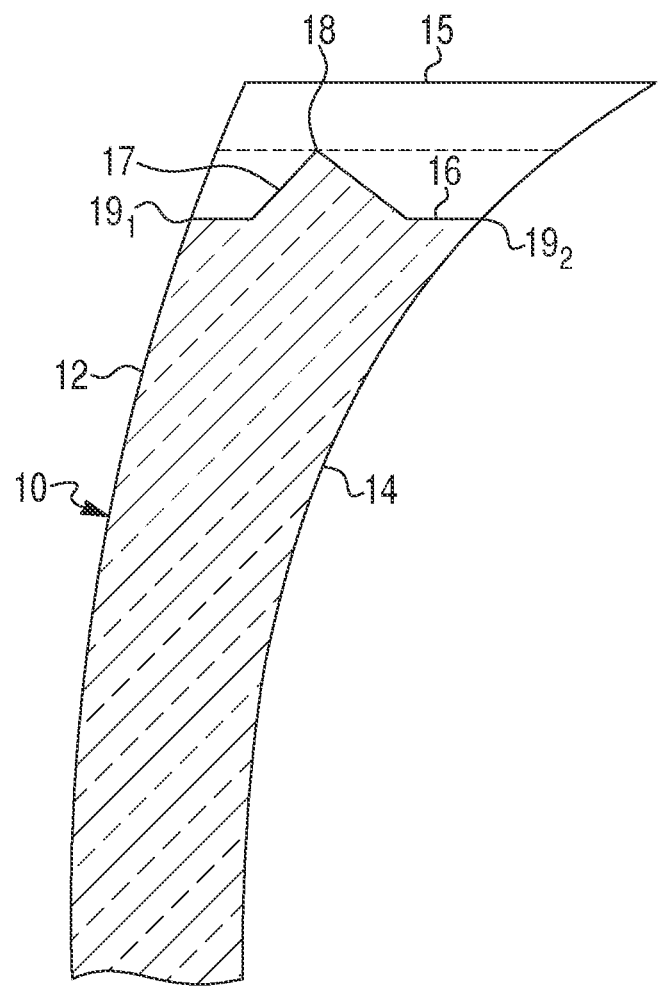
FIG. 3 illustrates an ophthalmic lens with a standard bevel edge.
Figure 4A:
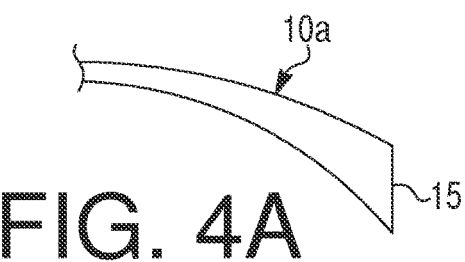
FIGS. 4A-4I illustrate ophthalmic lenses with different edge structures.
Figure 4B:
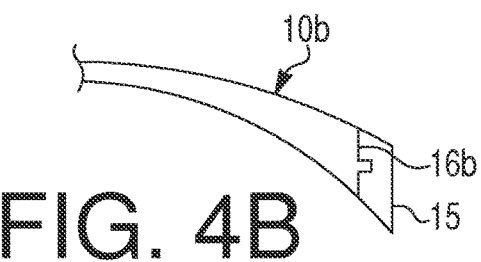
Figure 4C:
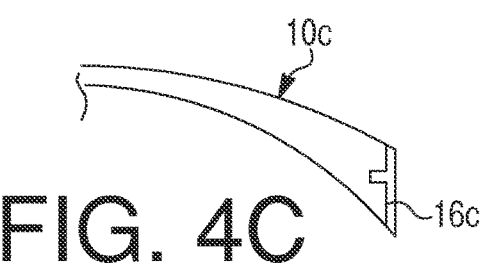
Figure 4D:
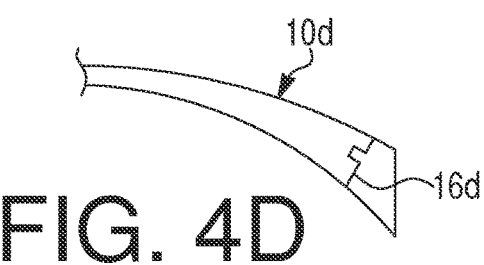
Figure 4E:
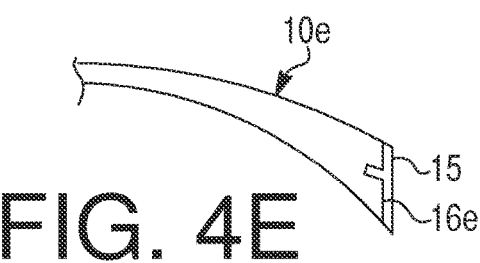
Figure 4F:
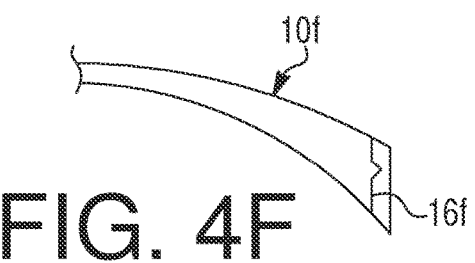
Figure 4G:
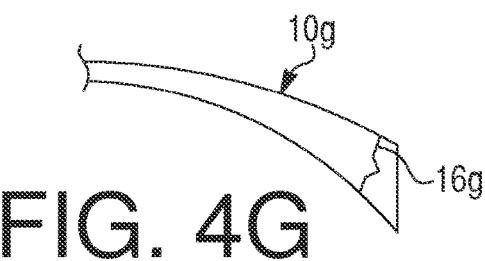
Figure 4H:
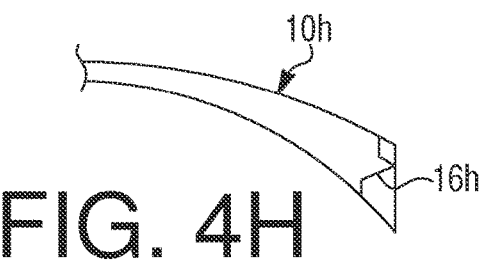
Figure 4I:
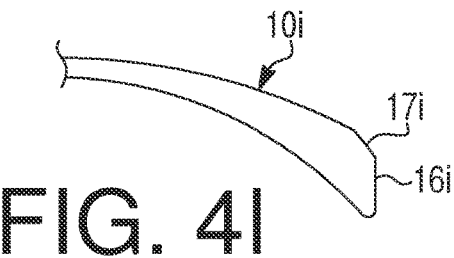

As illustrated in FIG. 3, an ophthalmic lens 10 to be seated in a frame includes first (convex) and second (concave) opposite optical surfaces 12 and 14, respectively, and a shaped, continuous outer peripheral edge 16 defined therebetween. The shaped outer peripheral edge 16 of the ophthalmic lens 10, as used hereinbelow, is a surface (or area) of the ophthalmic lens 10 between a first edge line $19_1$ (delimiting the first optical surface 12) and a second edge line $19_2$ (delimiting the second optical surface 14) that is shaped during processing of a blank (or unfinished) ophthalmic lens with a flat (i.e., original or unshaped) edge 15 by an edger to ensure that the ophthalmic lens 10 is able to be well secured and centered in an eyeglass frame as is well known in the art. Different edge structures are machined into the lens periphery, some of the main ones of which are shown in FIGS. 4A-4I. Moreover, the first and/or second edge lines $19_1$, $19_2$ define a perimeter of the ophthalmic lens 10 (or of the outer peripheral edge 16 of the ophthalmic lens 10).

FIGS. 4A-4I illustrates ophthalmic lenses with various types of circumferential (or outer) lens edges commonly used in the optical industry, such as (a) unfinished ophthalmic lens 10a with a flat (i.e., original or unshaped) edge 15, (a) shows a finished lens (b) finished ophthalmic lens 10b with T-bevel edge 16b, (c) finished ophthalmic lens 10c with a standard groove edge 16c, (d) finished ophthalmic lens 10d with an inclined standard groove edge 16d, (e) finished ophthalmic lens 10e with inclined groove edge 16e, (f) finished ophthalmic lens 10f with standard bevel edge 16f, (g) finished ophthalmic lens 10g with inclined bevel edge 16g, (h) finished ophthalmic lens 10h with step V-bevel edge 16h, and (i) finished ophthalmic lens 10i with safety bevel edge 16i. In other words, the edge 16 of the ophthalmic lens 10 may be provided with a groove or an outwardly extending V-bevel 17 having an apex 18 on the outer peripheral edge 16 of the ophthalmic lens 10, as best shown in FIGS. 3 and 4A-4I. As further illustrated in FIGS. 4A-4I, V-bevels can have different angles, widths and heights. The grooves and T-bevels can vary in width and depth, same as step backs (shelves). Safety bevels, such as the safety bevel edge 16i shown in FIG. 4I, can have different widths and appear or disappear around a lens perimeter based on the thickness of the lens edge 16i.

Figure 5A:
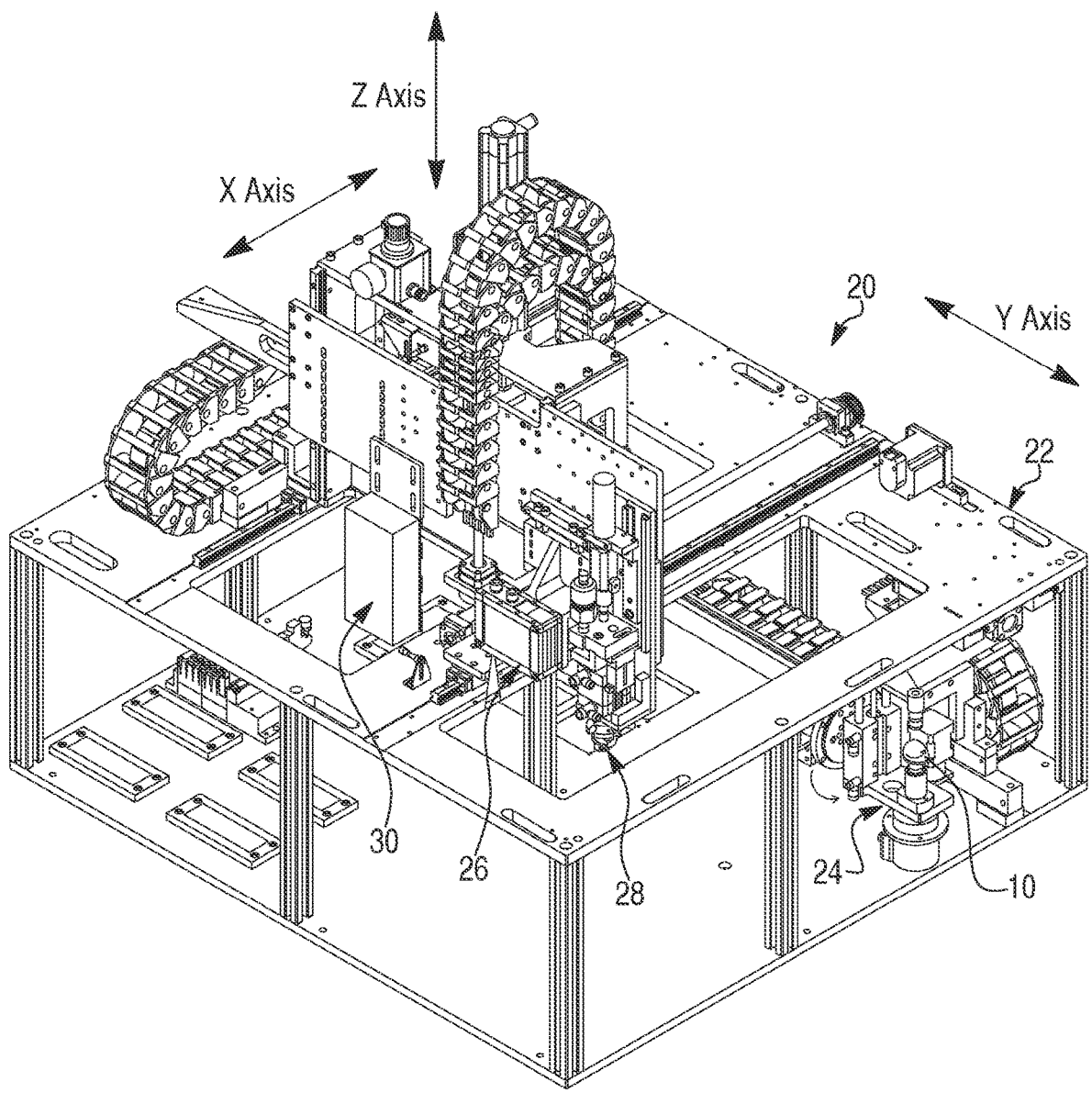
FIG. 5A is a perspective view of a machine for determining the peripheral shape and dimensions of a lens edge and for application of liquid to the edge profile of an ophthalmic lens in accordance with an exemplary embodiment of the present invention with the ophthalmic lens in a home position.
Figure 5B:
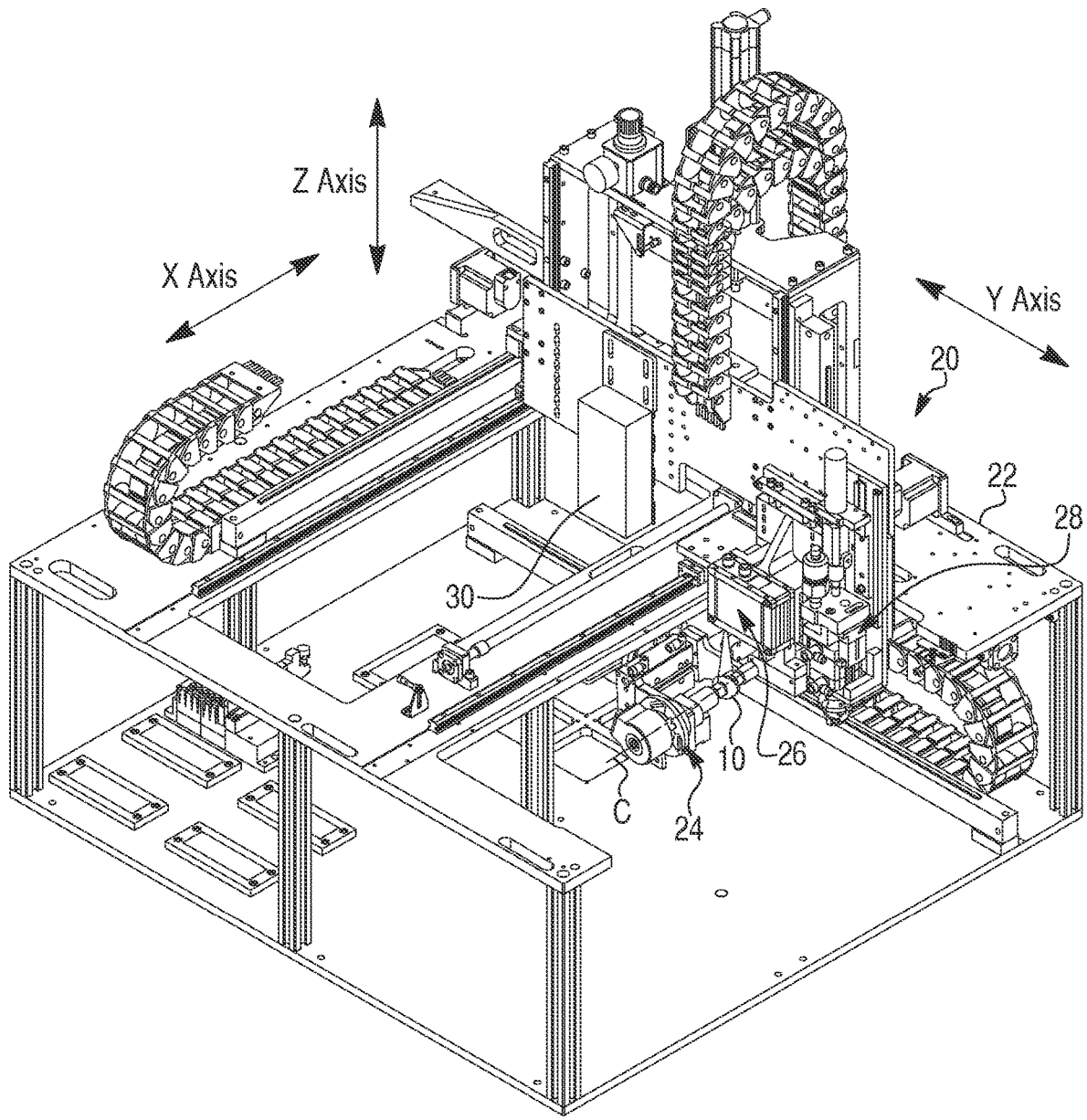
FIG. 5B is a partial perspective view of the machine of FIG. 5A with the ophthalmic lens in a working position.

FIGS. 5A and 5B illustrate an exemplary embodiment of a machine 20 for determination of the shape and dimensions of the lens periphery and for application of liquid to (or coating of) at least a portion of the outer peripheral edge 16 of an ophthalmic lens 10 in accordance with an exemplary embodiment of the present invention. The machine 20 comprises a machine frame 22, a lens holder unit 24, a laser scanner unit 26, a liquid dispensing unit (or dosing mechanism) 28, and a UV light curing unit 30. Each of the lens holder unit 24, the laser scanner unit 26, the liquid dispensing unit 28 and the UV light curing unit 30 is mounted to the machine frame 22, as best shown in FIGS. 5A and 5B.

FIGS. 5A and 5B show partial perspective views of the machine 20, wherein a width direction of the machine 20 is set as the X-direction (also described as "X-axis direction" hereinbelow), a length direction of the machine 20 is set as the Y-direction (also described as "Y-axis direction" hereinbelow), and a height direction (upper and lower direction) of the machine 20 is set as the Z-direction (also described as "Z-axis direction" hereinbelow). In the description hereinbelow, an axis parallel to the X-direction is set as the X-axis, an axis parallel to the Y-direction is set as a Y-axis, and an axis parallel to the Z-direction is set as the Z-axis. The X-direction, the Y-direction, and the Z-direction are set orthogonal to each other. Similarly, the X-axis, the Y-axis, and the Z-axis are set orthogonal to each other. In other words, the machine 20 is defined by Cartesian coordinate system of mutually perpendicular (i.e., orthogonal) X, Y and Z axes.

Figure 7:
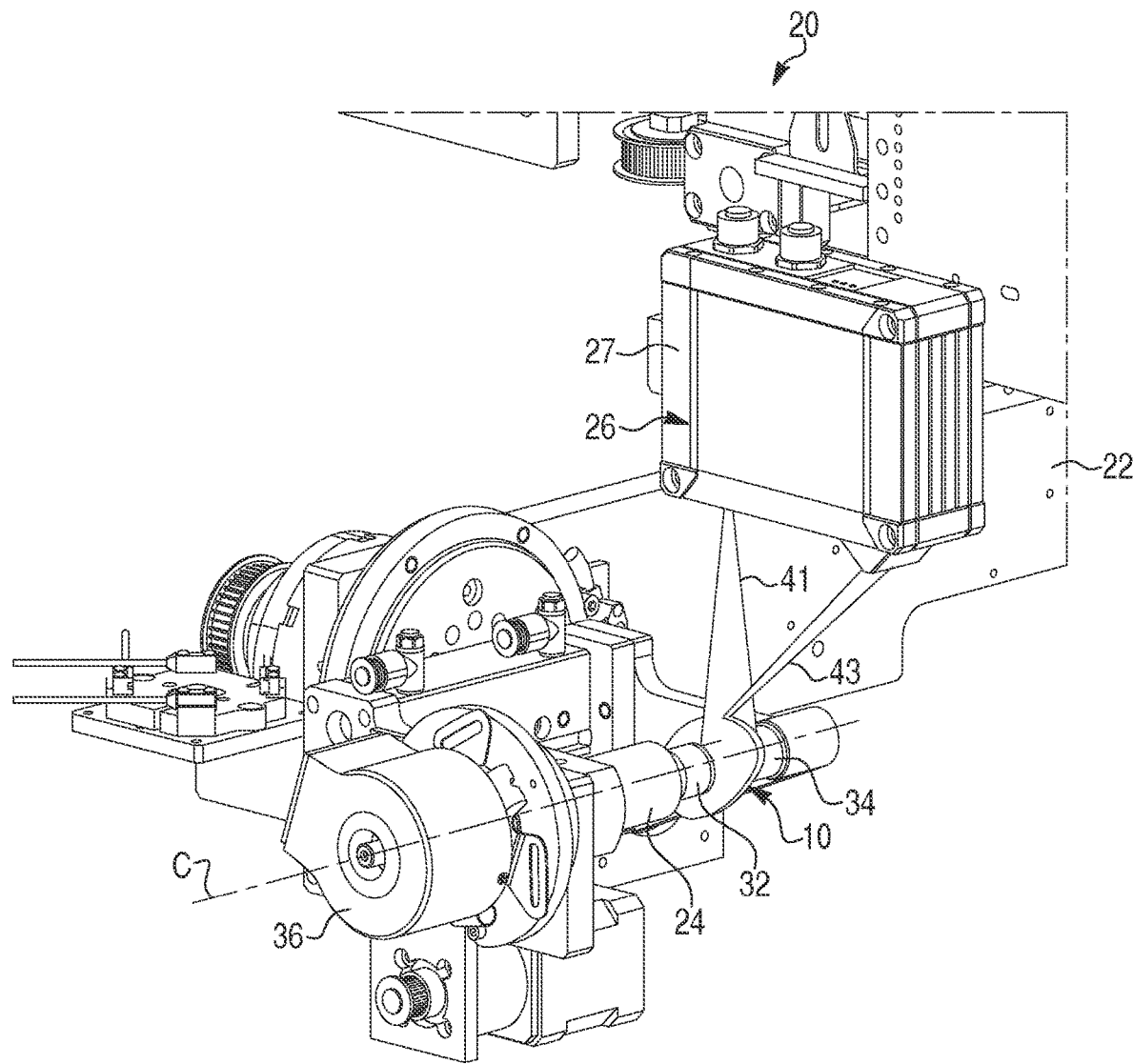
FIG. 7 is an enlarged partial perspective view of the machine of FIG. 5B showing a laser scanner unit and a lens holding unit in the working position.

The lens holder unit 24 is configured to selectively hold the ophthalmic lens 10. The lens holder unit 24 is moveable relative to the machine frame 22 between a home position holding the ophthalmic lens 10 away from the laser scanner unit 26, as shown in FIG. 5A, and a working position positioning the ophthalmic lens 10 adjacent, such as below, the laser scanner unit 26, as shown in FIG. 5B. The lens holder unit 24, according to the exemplary embodiment, includes a support chuck 32 and a hold-down chuck 34, as best shown in FIG. 7, which is selectively rectilinearly moveable toward and away from the support chuck 32.

Figure 8:
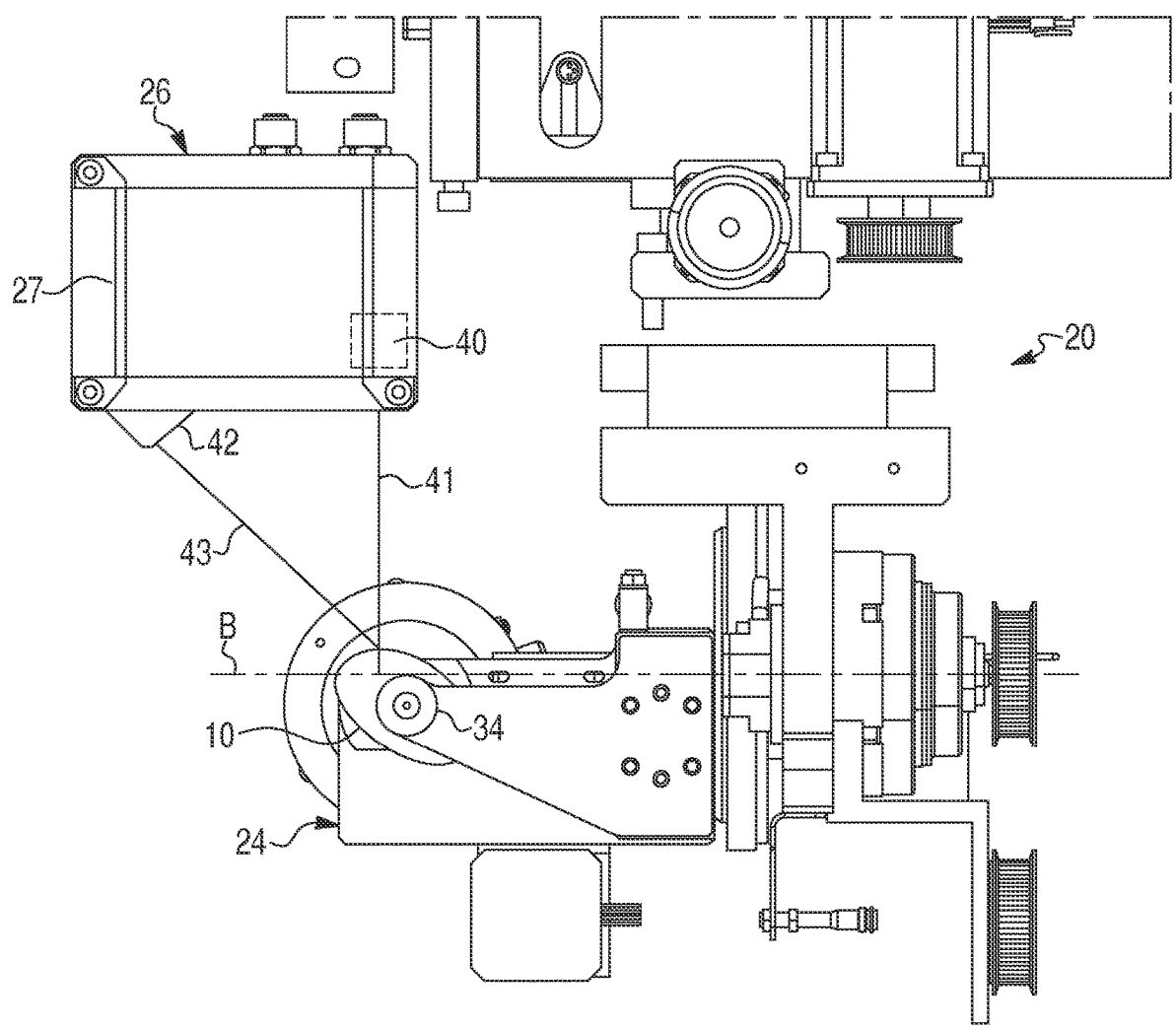
FIG. 8 is an enlarged partial side view of the machine of FIG. 5B showing the laser scanner unit and the lens holding unit in the working position.
Figure 9:
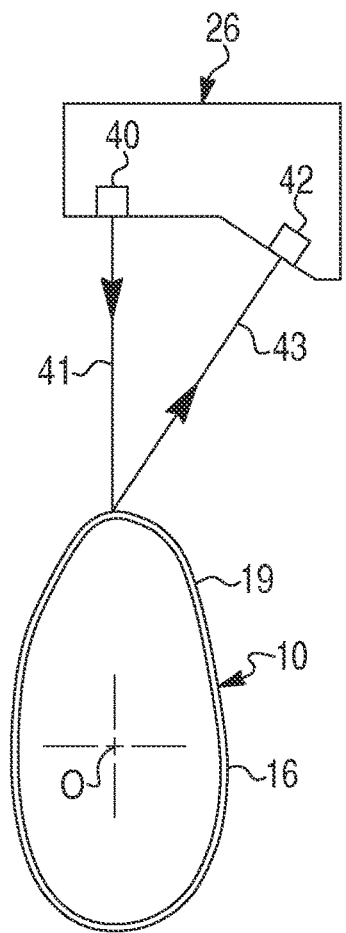
FIG. 9 is a front view of the laser scanner unit scanning the ophthalmic lens.

Moreover, the support chuck 32 and the hold-down chuck 34 are coaxial with one another. The lens holder unit 24 is configured to selectively clamp and non-movably secure the ophthalmic lens 10 between the support chuck 32 and the hold-down chuck 34. Accordingly, the support chuck 32 of the lens holder unit 24 engages one of the first and second opposite optical surfaces 12 and 14 of the ophthalmic lens 10, while the hold-down chuck 34 of the lens holder unit 24 engages another of the first and second opposite optical surfaces 12 and 14 of the ophthalmic lens 10. Rather than clamping the lens 10, the lens holder unit 24 may include a suction cup securing the front optical surface or the back optical surface of the lens 10. Moreover, lens holder unit 24 includes a motor 36, such as an electric motor, such as a stepper motor, for rotating the ophthalmic lens 10 secured by the lens holder unit 24 about a holder axis C (or C-axis of the lens holder unit 24), as best shown in FIG. 7. The C-axis of the lens holder unit 24 defines a center of rotation O of the ophthalmic lens 10, which coincides with the center of rotation of the ophthalmic lens 10, as best shown in FIG. 9. Furthermore, the lens holder unit 24, and thus the ophthalmic lens 10 as well, is tiltable (or pivotable) about an axis B (or B-axis) of the lens holder unit 24, as best shown in FIG. 8. Also, the lens holder unit 24 with the ophthalmic lens 10 may rectilinearly reciprocate along the Y-axis. Preferably, the B-axis is parallel to the Y-axis when the lens holder unit 24 is in the working position.

Figure 6:
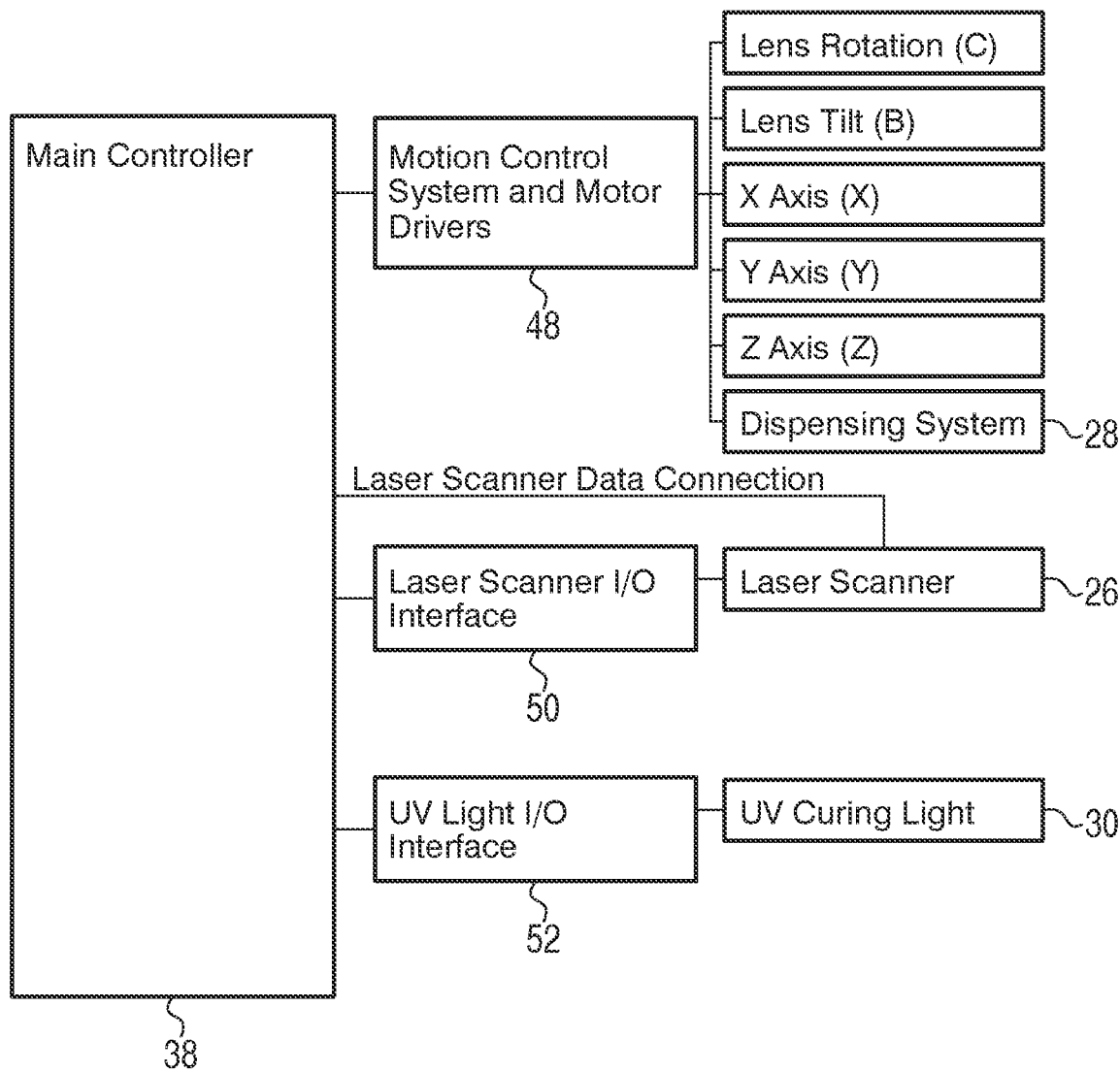
FIG. 6 is a block diagram of a control system of the machine of FIG. 5A according to exemplary embodiment of the present invention.

As illustrated in FIG. 6, the machine 20 further comprises a main controller 38 operatively connected to each of the laser scanner unit 26, to the liquid dispensing unit 28 and to the UV light curing unit 30, each of the liquid dispensing unit 28 and the UV curing unit 30 is rectilinearly moveably mounted to the machine frame 22 for movement in the X and Z axes. The main controller 38 includes hardware, software, and firmware for controlling operation of machine 20 and its components. The machine 20 further comprises a motion control system and motor drivers 48 (best shown in FIG. 6) operatively connected to, controlled by, and operated by the main controller 38. The motion control system and motor drivers 48 cooperate to selectively rotate the ophthalmic lens 10 about the lens holder axis C, selectively tilt the ophthalmic lens 10 about the axis B relative to the laser scanner unit 26, and move the lens 10 rectilinearly along the Y axis (front to back in the machine 20). The motion control system and motor drivers 48 are also selectively move the laser scanner unit 26, the liquid dispensing unit 28, and the UV light curing unit 30 rectilinearly along the X-axis (left/right in the machine 20) and Z-axis (up/down). The laser scanner unit 26 is operatively connected to the main controller 38 through a laser scanner interface 50, while the UV light curing unit 30 is operatively connected to the main controller 38 through a UV light interface 52, as best shown in FIG. 6.

Figure 10:
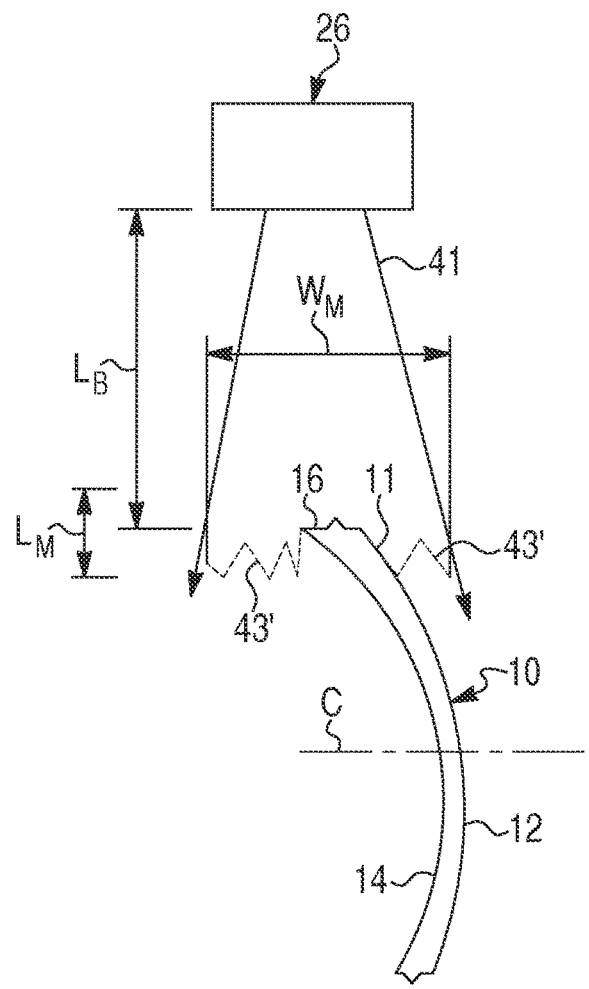
FIG. 10 is a side view of the laser scanner unit scanning the ophthalmic lens.

The laser scanner unit 26 is known in the art and includes a laser beam transmitter 40 and a laser sensor 42 in a casing 27. The laser beam transmitter 40 is configured to generate and emit (or project) a diffused laser beam (or projected laser line) 41 outwardly from the laser scanner unit 26 onto the outer peripheral edge 16 of the ophthalmic lens 10. The laser sensor 42 includes a highly sensitive sensor matrix and is configured to receive laser reflections (or reflected laser line) 43 from the outer peripheral edge 16 of the ophthalmic lens 10 viewable by the laser sensor 42, as best shown in FIGS. 7-10. As best shown in FIGS. 5B, 7 and 10, the laser beam transmitter 40 is diffused alongside the laser line (X axis). The laser beam transmitter 40 is a semiconductor laser, preferably a blue laser, although other laser types can be used. Commercially available laser scanners suitable for measuring a 3D edge profile of the outer peripheral edge 16 of the ophthalmic lens 10 are 3D line laser scanners from Micro-Epsilon, such as the scanCONTROL and surfaceCONTROL lines of laser scanners, e.g., scanCONTROL LLT3000-25/BL-SI. The sensor matrix of the laser sensor 42 typically includes a charge-coupled device (CCD), which is a light-sensitive integrated circuit that captures images by converting photons to electrons. The CCD sensor breaks the image elements into pixels.

As shown in FIGS. 5B, 7 and 10, the diffused laser beam 41 has a trapezoidal shape and is diffused in a direction perpendicular to the outer peripheral edge 16 between the first and second opposite optical surfaces 12 and 14 of the ophthalmic lens 10 and perpendicular to the first and second edge lines $19_1$ and $19_2$, respectively. As best shown in in FIGS. 7-10, the diffused laser beam 41 is projected toward the outer peripheral edge 16 of the ophthalmic lens 10 by the laser scanner unit 26, then reflected back toward the laser sensor 42 of the laser scanner unit 26. As further shown in FIGS. 9 and 10, the projected laser line 41 reflected from the outer peripheral edge 16 of the ophthalmic lens 10 as the reflected laser line 43 is strong and detectable by the laser sensor 42, while the projected laser line 41 projected toward areas 11 outside the outer peripheral edge 16 of the ophthalmic lens 10 produces either weak or no reflected laser line 43', which cannot be detected by the laser sensor 42 of the laser scanner unit 26.

From the image acquired by the sensor matrix of the laser sensor 42, a processing unit internal to the laser sensor 42 processes the image and reports the X, Z coordinates to the main controller 38, which calculates the distance (Z-axis) and the position alongside the laser line (X-axis). The measured values are then output in a two-dimensional coordinate system (X, Z) that is fixed with respect to the laser scanner unit 26. In the case of moving objects or traversing scanners, it is possible to obtain 3D measurement values. In other words, a plurality of 2D scans (measurement values) are acquired, then converted to 3D measurement values around the entire outer peripheral edge 16 of the ophthalmic lens 10. Software available from Micro-Epsilon, for example, may be used to implement the conversion. Accurate measuring data at any location around the lens perimeter requires an additional 4th degree of freedom to maintain the projected laser line 41 normal to at least a portion of the outer peripheral edge 16 at all times. The $4^{th}$ degree of freedom is the Y-axis, allowing the laser line 41 to be projected so that it does not pass through the center C of rotation of the ophthalmic lens 10. The laser 41 is offset so that it does not intersect the C axis for the fine scan. Because the chuck is a fixed size and orientation in the machine, and because the chuck 32 is preferably made of materials that do not provide a specular reflection, reflections from the chuck 32 can be excluded from the collected data set during the fine scan. The machine 20 of the present invention can also use a $5^{th}$ axis in the form of the B axis, allowing the projected laser line 41 to be projected normal to features such as the angled surface of the bevel 17 rather than only normal to the flat (in the direction parallel to axis of the ophthalmic lens 10) edged portion of the lens edge 16.

The main controller 38 is connected to the laser scanner unit 26 and exchanges various signals and data, including control signals for controlling operation of the laser scanner unit 26, measuring the 3D edge profile of the outer peripheral edge 16 of the ophthalmic lens 10, moving the laser scanner unit 26 relative to the ophthalmic lens 10 when the lens holder unit 24 is in the working position, and measurement (or geometric) data from the laser scanner unit 26, between the laser scanner unit 26 and the main controller 38.

Figure 11A:
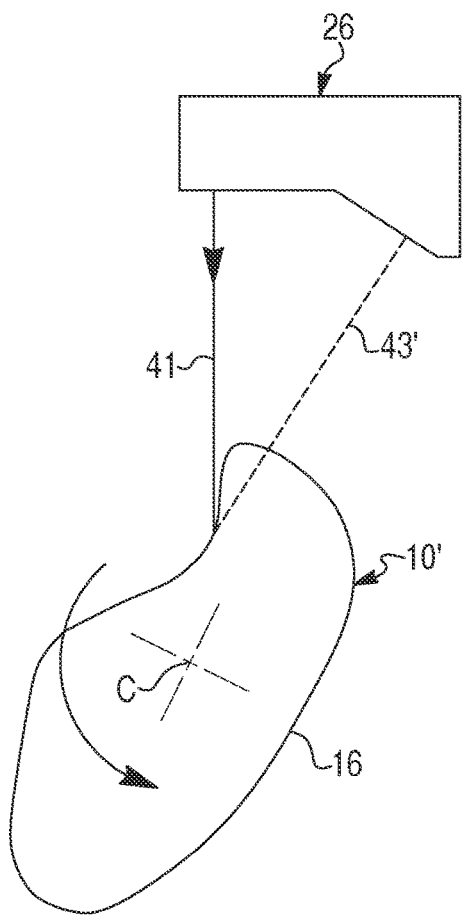
FIG. 11A is a front view of the laser scanner unit scanning an ophthalmic lens having a concave section.
Figure 11B:
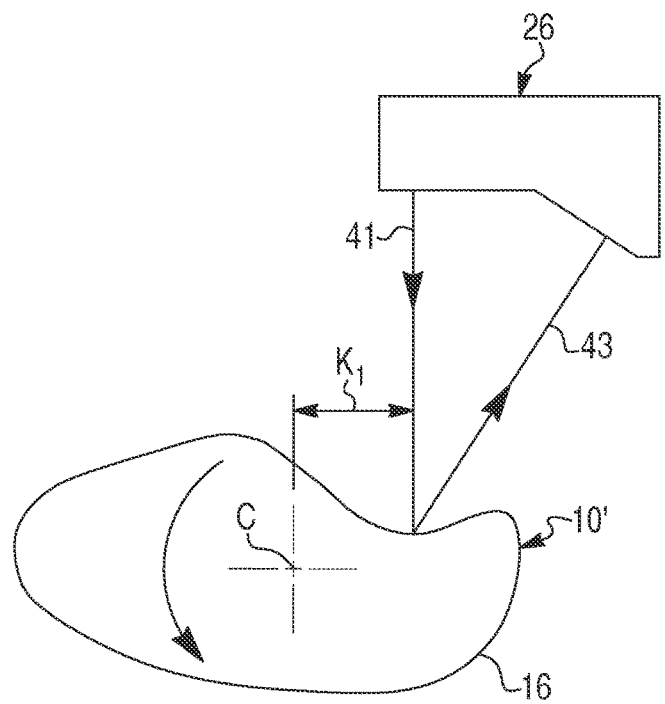
FIG. 11B is a front view of the laser scanner unit scanning the ophthalmic lens having the concave section, which is rotated with respect to the position of the ophthalmic lens in FIG. 11A.

Sometimes, an ophthalmic lens 10' may have concave sections or other geometry in which the reflected laser line 43' may be blocked by the lens itself, as shown in FIG. 11A. In this case it is necessary to rotate the lens 10' and create an offset $K_1$ of the projected laser line 41 with respect to the C-axis (i.e., the axis of rotation of the ophthalmic lens 10') in the Y-direction, as shown in FIG. 11B, in order to allow the sensor 42 to receive the reflected laser light 43.

Figure 12A:
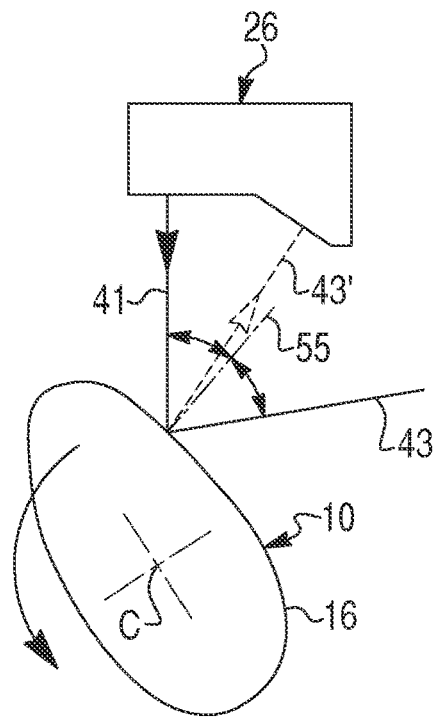
FIG. 12A is a front view of the laser scanner unit scanning the ophthalmic lens, wherein an angle of a projected laser line with respect to the outer peripheral edge of the ophthalmic lens is significantly less than 90°.
Figure 12B:
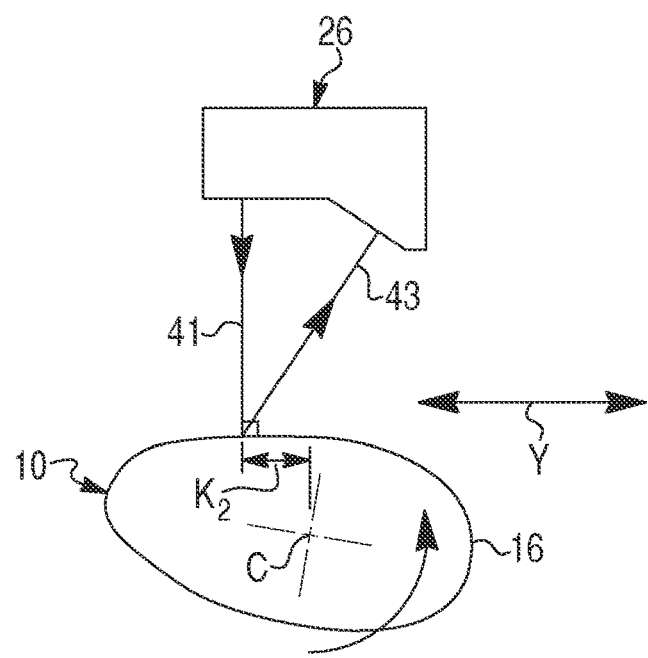
FIG. 12B is a front view of the laser scanner unit scanning the ophthalmic lens, wherein the ophthalmic lens is rotated and offset from the projected laser line in Y-direction relative to a position of the ophthalmic lens in FIG. 12A.

In other cases, the angle of the projected laser line 41 with respect to the outer peripheral edge 16 of the ophthalmic lens 10 or the edge line 19 is significantly less than 90°, as shown in FIG. 12A. In such a case, particularly on a highly polished lens edge, the laser sensor 42 of the laser scanner unit 26 may not receive a strong enough reflected laser line 43 to create a clear image of the outer peripheral edge 16. Only weak reflected laser line 43', which cannot be detected by the laser sensor 42 of the laser scanner unit 26, is reflected toward the laser sensor 42, as shown in FIG. 12A. Please note that the reference numeral 55 in FIG. 12A marks a normal (i.e., line perpendicular) to the outer peripheral edge 16 and the lens edge line 19 of the ophthalmic lens 10. Accordingly, the ophthalmic lens 10 must be rotated and the C-axis of the lens 10 offset by an offset $K_2$ from the projected laser line 41 in Y-direction in order to provide a strong reflected laser line 43 detectable by the laser sensor 42, as best shown in FIG. 12B. Please note that the projected laser line 41 in FIG. 12B is normal (i.e., line perpendicular) to the outer peripheral edge 16 and the lens edge line 19 of the ophthalmic lens 10.

Figure 13A:
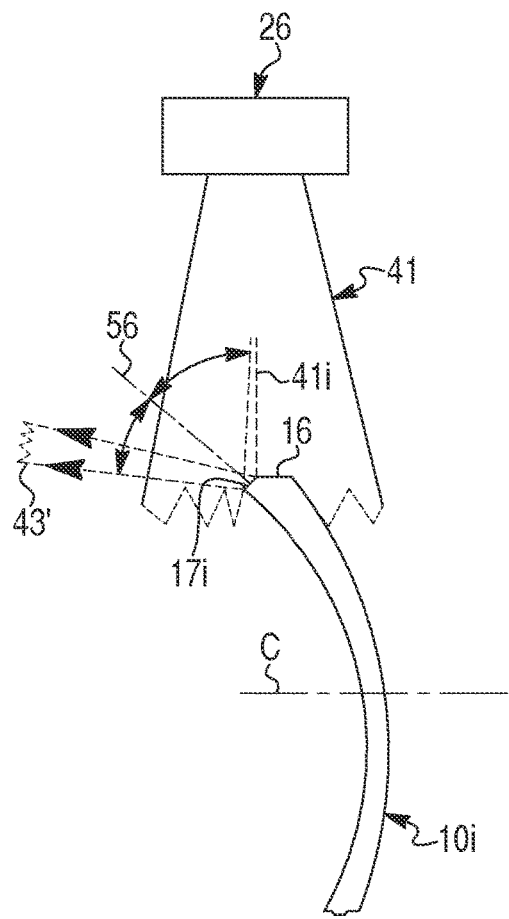
FIG. 13A is a side view of the laser scanner unit scanning the ophthalmic lens, wherein an angled safety bevel of the ophthalmic lens reflects the projected laser line away from the laser scanner unit.
Figure 13B:
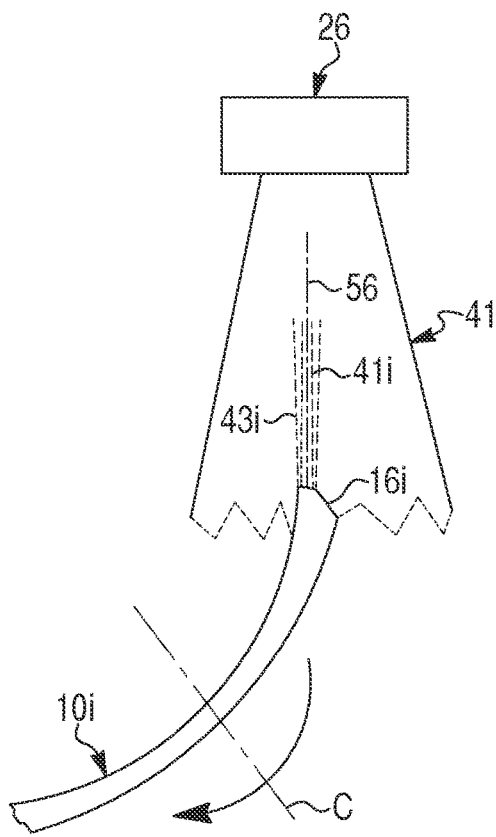
FIG. 13B is a front view of the laser scanner unit scanning the ophthalmic lens, wherein the ophthalmic lens is tilted so that the laser line projected to the angled safety bevel is reflected back to the laser scanner unit.

Various features of the edge profile of the outer peripheral edge 16 of the ophthalmic lens 10, such as safety bevels 17i, may be angled with respect to the laser scanner unit 26. The laser scanner unit 26 may be perfectly positioned to measure the finished edge profile of a rimless lens, but the angled safety bevel 17i may reflect the projected laser line 41 away from the laser sensor 42, as shown in FIG. 13A as the weak reflected laser line 43'. In order to obtain good readings (i.e., readings detectable by the laser sensor 42) from these features, the ophthalmic lens 10 is tilted so that the laser line 41i projected onto the angled safety bevel 17i is reflected back to the laser sensor 42, as shown in FIG. 13B as a reflected laser line 43i. Please note that the reference numeral 56 in FIGS. 13A and 13B marks a normal (i.e., line perpendicular) to the angled safety bevel 17i of the outer peripheral edge 16 of the ophthalmic lens 10.

The laser scanner unit 26 is mounted to the machine frame 22 so as to be rectilinearly moveably along the Z-axis of the machine 20 toward and away from the outer peripheral edge 16 of the ophthalmic lens 10 when the lens holder unit 24 is in the working position.

In operation, the shaped ophthalmic lens 10 is held by the lens holder unit 24 and moved into the diffused laser beam 41 projected by the laser scanner unit 26. The laser scanner unit 26 uses the laser triangulation principle for two-dimensional profile detection on different target surfaces. The laser triangulation means distance measurement by angle calculation. In measurement technology, a laser beam transmitter projects a laser beam onto a measurement object. The laser reflection (or reflected light) falls incident onto the laser sensor (or receiving element) at a certain angle depending on the distance. From the position of the light spot on the laser sensor and the distance from the laser beam transmitter to the laser sensor, the distance to the measurement object is calculated via basic principles of geometry in the laser scanner unit. The measurement object is a body whose movement, position, or dimension is to be measured by the laser scanner unit. In other words, the laser scanner unit uses the laser triangulation principle for two-dimensional profile detection on different target surfaces. By using lenses, a laser beam is enlarged to form a static laser line and is projected onto the target surface, such as an outer peripheral edge of an ophthalmic lens. The laser beam transmitter projects the diffusely reflected light of the laser line onto the targeted surface, from which it is reflected onto a laser sensor including a highly sensitive sensor matrix. From a matrix image, the controller calculates the distance information (Z-axis) and the position alongside the laser line (X-axis). These measured values are then output in a two-dimensional coordinate system that is fixed with respect to the laser scanner unit. In the case of moving objects or a traversing laser scanner unit, it is therefore possible to obtain 3D measurement values.

The laser beam transmitter 40 projects the diffused laser beam 41 onto the outer peripheral edge 16 of the ophthalmic lens 10. Then, the reflected laser line 43 from the outer peripheral edge 16 of the ophthalmic lens 10 is received by the sensor matrix of the laser sensor 42, based on which a matrix image of the outer peripheral edge 16 of the ophthalmic lens 10 is formed. Then, the main controller 38 calculates the distance information (Z-axis) and the position alongside the laser line (X-axis) of the outer peripheral edge 16 of the ophthalmic lens 10 from the matrix image of the outer peripheral edge 16 of the ophthalmic lens 10.

These measured values are then output in a two-dimensional coordinate system (X and Z) that is fixed with respect to the laser scanner unit 26. Accurate measurement data (i.e., scan data) at any location around the lens perimeter requires the additional 4th degree of freedom to maintain the projected laser line 41 normal to the outer peripheral edge 16 of the ophthalmic lens 10 at all times. The projected laser line 41 is maintained normal to the outer peripheral edge 16 of the ophthalmic lens 10, as shown in FIG. 12B, by calculating the normal direction from the scan data or job data, rotating the lens 10 to orient a scan point (or point of measurement) normal to the laser beam transmitter 40 of the laser scanner unit 26, and moving the lens 10 so that the scan point is underneath the laser beam transmitter 40 of the laser scanner unit 26. As a result, the machine 20 of the present invention generates an accurate 3D-profile of the outer peripheral edge 16 of any given ophthalmic lens for subsequent processing.

The method of operation of the machine 20 is as follows. First, the ophthalmic lens 10 is secured in the lens holder unit 24 between the support chuck 32 and the hold-down chuck 34. Then, the ophthalmic lens 10 is moved from the home position to the working position beneath the laser sensor 42 of the laser scanner unit 26.

Next, a rough (or initial) lens scan of the outer peripheral edge 16 of the ophthalmic lens 10 along the perimeter of the ophthalmic lens 10 is conducted to acquire an approximate lens shape of the outer peripheral edge 16 of the ophthalmic lens 10 by the laser scanner unit 26 while rotating the ophthalmic lens 10. The approximate lens shape (or profile) is obtained by scanning the lens periphery with the laser scanner unit 26 at a first predetermined number N1 (for example 32) of initial points of measurement (or initial scan points) spaced equiangularly around the circumference (or perimeter) of the ophthalmic lens 10 for the initial lens scan. Specifically, the initial scan points are spaced at 360°/N1 between the initial scan points.

At each measurement point the X-axis and Z-axis measurement data of the outer peripheral edge 16 are determined by the laser scanner unit 26. The ophthalmic lens 10 is then moved (rotated) to the next point and the laser scanner unit 26 moved in X-direction and Z-direction, if required, so that the scanned outer peripheral edge 16 of the lens 10 is maintained within a measurement field of the laser scanner unit 26 for each measurement. The ophthalmic lens 10 is not moved in the Y direction during the initial lens scan. The measurement field is defined by a rectangle ($W_M \times L_M$), wherein $W_M$ is a width of the diffused laser beam 41 in the vicinity of the outer peripheral edge 16 of the ophthalmic lens 10, while $L_M$ is the height of a portion of the diffused laser beam 41 in the vicinity of the outer peripheral edge 16, as shown in FIG. 10. According to the exemplary embodiment, $W_M$ is in a range between 20 to 30 mm, preferably 25 mm, and $L_M$ is in a range between 20 to 10 mm, preferably 15 mm. Moreover, the measurement field is oriented so that the outer peripheral edge 16 of the ophthalmic lens 10, disposed within the measurement field, is spaced from the laser scanner unit 26 an optimal reading (or measuring) distance $L_B$, at which the reflected laser line 43 is optimal and easily detectable by the laser sensor 42 of the laser scanner unit 26. According to the exemplary embodiment, the measuring distance $L_B$ is in a range of between 80 to 90 mm, preferably 85 mm.

As noted above, the machine 20 for scanning the outer peripheral edge 16 of the ophthalmic lens 10 has 5 axes defined as follows:
- the axis X is the Left to Right axis used to maintain the outer peripheral edge 16 centered within the measurement field of the laser scanner unit 26;
- the axis Y is the In and Out (or Front and Back) axis used to position the outer peripheral edge 16 normal and also non-normal to the laser scanner unit 26;
- the axis Z is the up and down axis used to position the outer peripheral edge 16 centered within the measurement field of the laser scanner unit 26;
- the axis B is the Tilt/Rotation axis around the Y-axis used to position the outer peripheral edge 16 in appropriate orientation to allow optimum scanning/detection of the reflected laser line 43; and
- the axis C is the Rotation axis of the ophthalmic lens 10 used to rotate the ophthalmic lens 10 in relation to the laser scanner unit 26 when the lens holder unit 24 is in the working position.

The ophthalmic lens 10 is mounted to the lens holder unit 24 such that, when the lens holder unit 24 is in the working position, the first (convex) optical surface 12 is normal (or perpendicular) to the X axis, and the laser scanner unit 26 is moveable along axes X and Z of the machine 20.

During the rough lens scan, the ophthalmic lens 10 is first positioned so that the projected laser line 41 intersects the center of rotation of the ophthalmic lens 10, and the laser scanner unit 26 is positioned so that the outer peripheral edge 16 of the largest ophthalmic lens 10 that can be processed in the machine 20 is inside the laser scanner measurement field. If the laser scanner unit 26 does not find the outer peripheral edge 16 of the ophthalmic lens 10 based on the measurement data (for example if the lens radius is smaller than the maximum scannable lens radius), then the laser scanner unit 26 is lowered along the Z-axis until the outer peripheral edge 16 of the ophthalmic lens 10 is found by the laser scanner unit 26. Then, the outer peripheral edge 16 of the ophthalmic lens 10 is centered in the measurement field, both in the X-axis and the Z-axis.

The ophthalmic lens 10 is measured a second time by the laser scanner unit 26 to ensure that it is completely centered in the measurement field, and then re-centered in the measurement field in both the X-axis and Z-axis. This second measurement and centering operation is undertaken in case some portion of the lens peripheral edge 16 is outside of the measurement field prior to the first centering operation.

Next measurement data of the outer peripheral edge 16 of the ophthalmic lens 10 is acquired by sequentially rotating, step by step, the ophthalmic lens 10 via the C-axis and acquiring measurement data at the first predetermined number N1, preferably 32, of the initial points of measurement on the perimeter of the ophthalmic lens 10. The N1 measurement points are equiangularly spaced about the lens 10. At each point of measurement, the X-axis and Z-axis measurement data of the outer peripheral edge 16 are obtained by the laser scanner unit 26 and the ophthalmic lens 10 is moved, e.g. rotated, to the next point of the measurement. The ophthalmic lens 10 moves incrementally, i.e., the ophthalmic lens 10 stops at each of the 32 points of measurement to take each measurement. The outer peripheral edge 16 of the ophthalmic lens 10 is maintained inside the measurement field at all times by moving the laser scanner unit 26 as required. Consequently, the approximate (or rough) lens shape is acquired. Once the rough (or initial) profile of the outer peripheral edge 16 of the ophthalmic lens 10 has been acquired, it is then correlated to known traced perimeter data for the scanned lens 10, downloaded from connected tracer machines, an ophthalmic laboratory management server, or another data source. This is the same data that is used by the edger to cut the lens, and should be a good but not perfect representation of the actual lens shape. The correlation process preferably uses an iterative technique fitting method to match the scanned shape data to the trace shape data. The distance from each scanned point to the trace shape is calculated, and those distances are summed to a quality of fit parameter. The trace shape data is translated and rotated until an optimal (minimum) value for the quality of fit parameter is achieved. After this fitting process is complete, the scanned data is no longer used. The rotated and translated trace data is used as the basis for all further calculations. The trace data is also known as "job data" though the job data includes not only the trace data but other information about the ophthalmic lens 10 (right/left eye, prescription, material etc.).

The modified trace data is then offset outwardly using known mathematical techniques for inflating polygons and creating an enlarged shape. The enlarged trace data is smoothed using known mathematical techniques, such as Fourier transform smoothing. A second predetermined number N2 of main points of measurement (or main scan points) (for example 64) are generated equally spaced around this enlarged perimeter shape of the ophthalmic lens 10. The enlarged shape and points are then offset inwardly using known mathematical techniques for deflating polygons, thus recreating the initial trace shape that has now been smoothed. The impact of this inward offset is to alter the spacing of the N2 main scan points, depending upon the local curvature of the ophthalmic lens 10. In areas of the ophthalmic lens 10 with small radius corners, for example, the main scan points become more closely spaced. This is desirable to create a fine scan that fully captures the true edge shape of the ophthalmic lens 10 by in essence increasing relative scan resolution in highly curved areas of the lens peripheral edge 16 and decreasing relative scan resolution in areas of the lens peripheral edge 16 having more gradual curves.

Alternatively, for ophthalmic lenses having concave sections or other geometry that block the laser reflection, e.g., as shown in FIG. 11A, an alternative method of acquiring the lens shape may be employed. Specifically, the ophthalmic lens is moved in the Y-axis direction incrementally between the N1 initial points of measurement. At every increment the reflected laser line 43 is recorded and once there is no reflected laser line 43 detected by the laser sensor 42 of the laser scanner unit 26, the ophthalmic lens 10 is rotated such that the last point of measurement, where no reflected laser line 43 was detected, is now vertically below the laser beam transmitter 40. This is repeated until an overlap in measured points has been detected. Data collected using this method is then processed as previously mentioned to create a set of N2 points for the subsequent fine scan.

Alternatively, if a single scan data point in the rough scan is missed, that skip point can be skipped or disregarded, and the analysis continue on to the next measurement point. If two scan data points in a row are missed, the scan can be terminated and the lens repositioned by the operator before a rescan.

Profile data is generated and stored as part of the process for manufacturing the edged lenses. The trace data is obtained from a tracer (such as from the 4Tx of National Optronics), and is then used by the edger (such as the QM-X4 from National Optronics) to create the finished edged lens. The rough/initial lens scan is done without any reference to this trace data. The trace data can also be known as "job data" though job data includes not only the trace but other information about the lens (right/left eye, prescription, material, etc). The trace data is used in the previous steps, and must be used.

Next, using the processed trace data of the ophthalmic lens 10, a main or fine lens scan along the perimeter of the ophthalmic lens 10 is conducted. From the approximate profile of the outer peripheral edge 16 of the ophthalmic lens 10 obtained during the initial lens scan, the normal relative to the lens edge 16 is determined so that the fine lens scan can be taken by scanner 42 for a more accurate edge reading.

The lens edge profile is obtained by scanning the lens periphery with the laser scanner unit 26 at the second predetermined number N2 of the main points of measurement (or main scan points) spaced around the circumference (or perimeter) of the ophthalmic lens 10 for the accurate lens scan. Those main scan points have been determined by previous calculations above. This measurement is referred to as the fine lens scan. The number N2 of the main points of measurement is significantly larger (such as twice larger) than the number N1 of the initial points of measurement. The main (or fine) lens scan of the outer peripheral edge 16 of the ophthalmic lens 10 along the perimeter of the ophthalmic lens 10 is conducted to acquire an accurate lens shape of the outer peripheral edge 16 of the ophthalmic lens 10 by the laser scanner unit 26 while rotating the ophthalmic lens 10. The fine scan data is more accurate for at least the following reasons: (a) there are more points being scanned, essentially increasing the resolution of the scan result; (b) using the position data from the rough scan, the lens peripheral edge 16 can be positioned more nearly in the center of the laser measuring field where the laser measurement errors are at a minimum; (c) using the trace data, the projected laser line 41 can be arranged normal to the lens peripheral edge 16 at every scan point (which is more accurate); and (d) scan points are placed more densely in places where the lens shape changes quickly (e.g., the corners of lenses), increasing scan fidelity in these sections. Moreover, the main controller 38 spaces the measurement points a first distance around low curvature portions of the lens periphery and a second distance around high curvature portions of the lens periphery, wherein the first distance exceeds the second distance.

During the fine scan of the outer peripheral edge 16 of the ophthalmic lens 10 is positioned in the center of the measurement field so that the projected laser line 41 of the laser scanner unit 26 is normal (i.e., perpendicular) to the perimeter of the outer peripheral edge 16 of the ophthalmic lens 10 by using the X, Y, Z, B and C axes, i.e., by rotating and tilting the ophthalmic lens 10 and rectilinearly moving the ophthalmic lens 10 forwards and backwards along the Y-axis, by rectilinearly moving the laser scanner unit 26 up and down along the Z-axis, and by rectilinearly moving the laser scanner unit 26 left and right along the X-axis. A scan normal to the lens edge 16 is needed because the ophthalmic lens 10 may possess geometry that could obstruct the laser reflection if positioned appropriately (see FIGS. 11A-13B).

The outer peripheral edge 16 of the ophthalmic lens 10 recorded during the rough lens scan is used to determine any tilt angle needed to position the lens edge 16 normal to the projected laser line 41 of the laser scanner unit 26 with the B-axis. This is done for all N2 main points of measurement, and the laser measurement data is then recorded for each of these main points of measurements.

The measurement data recorded by the laser scanner unit 26 during the fine lens scan is then smoothed by known mathematical techniques, such as conversion to nonuniform ration B-splines (NURBS). Smooth splines are function estimates obtained from a set of noisy observations of the target in order to balance a measure of goodness of fit of with a derivative based measure of the smoothness of the function estimates. They provide a means for smoothing noisy x, y data so that the measurement data of the outer peripheral edge 16 of the ophthalmic lens, such as the local radius from the center of lens rotation to the lens outer peripheral edge 16 and the lens edge features (i.e., edge features marked 16, 17, 18, 19$_1$ and 19$_2$ in FIG. 3), for any angle around the C-axis provides an accurate profile of the outer peripheral edge 16 of the ophthalmic lens 10.

Figure 14A:
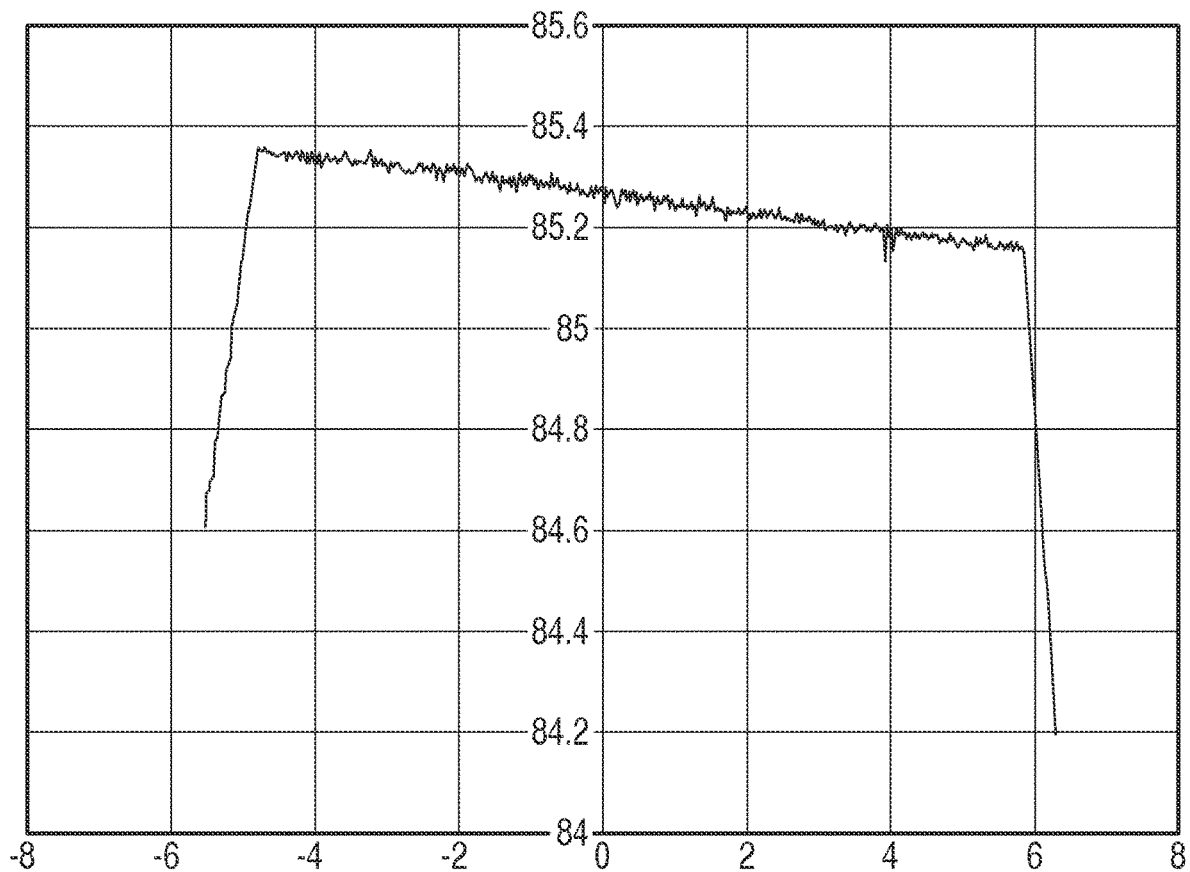
FIGS. 14A, 14B and 14C show outer peripheral edges of rimless, beveled and grooved ophthalmic lenses, respectively, as scanned by the laser scanner unit.
Figure 14B:
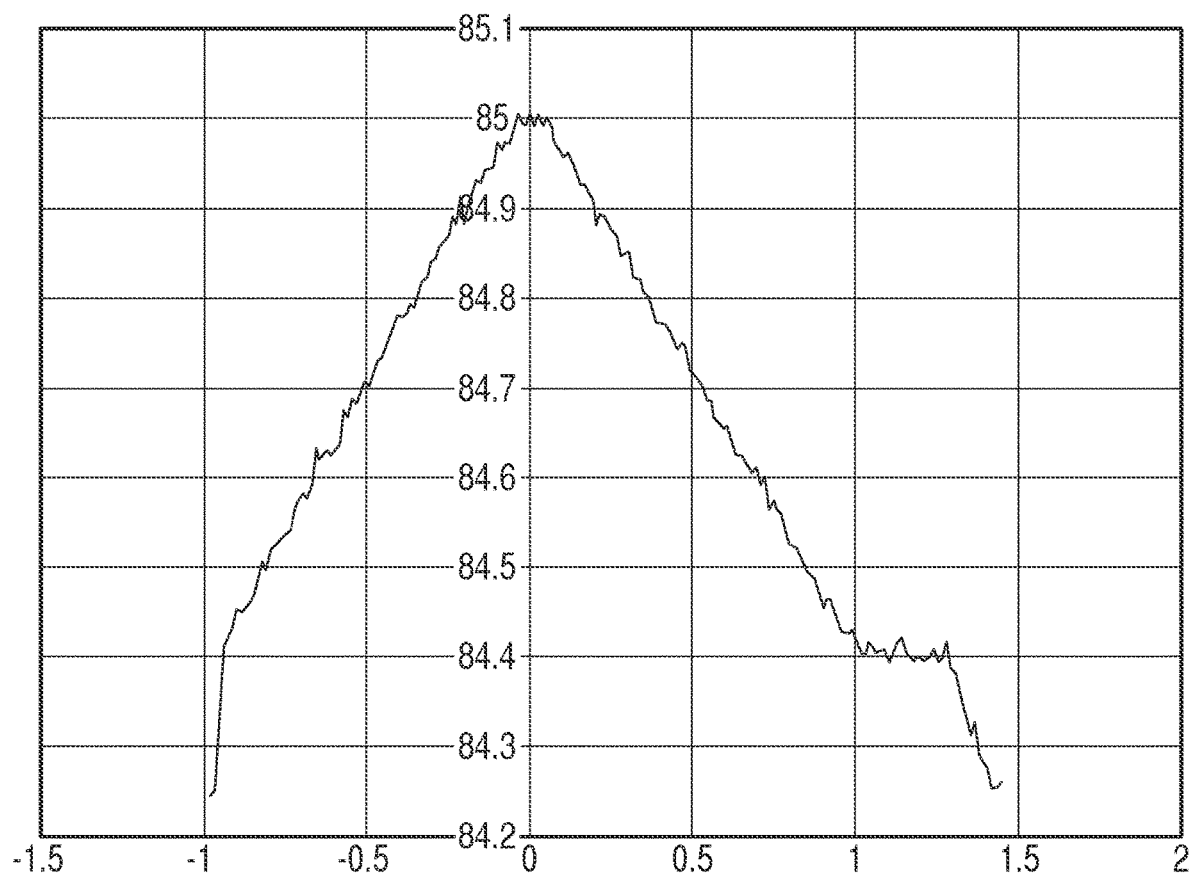
Figure 14C:
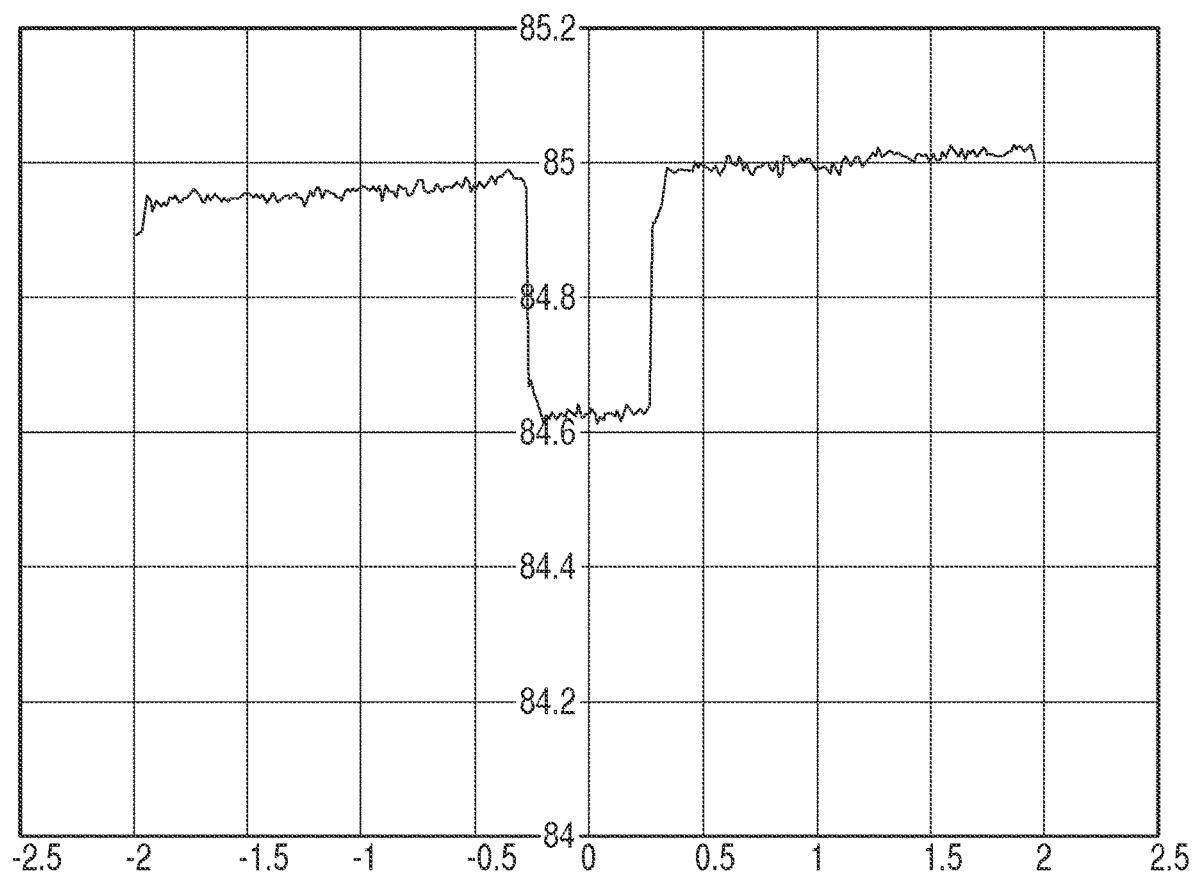

Examples of the accurate profiles of the outer peripheral edge 16 of the ophthalmic lens 10 obtained during the fine lens scan are illustrated in FIGS. 14A, 14B and 14C showing outer peripheral edges of the rimless, beveled and grooved ophthalmic lenses, respectively.

Once the measuring data is retrieved from the laser scanner unit 26 and synchronized with the points of measurement on the perimeter of the ophthalmic lens 10, the 3D profile of the outer peripheral edge 16 of the ophthalmic lens 10 is created. This edge profile allows for calculation of e.g. the lens edge surface size in discrete locations around the lens perimeter. Additionally, any tool can be positioned with high accuracy in relation to the ophthalmic lens 10 and potential collisions can be avoided.

It should be noted that in the event the ophthalmic lens 10 has drill notches or similar features that cause discontinuity in the outer peripheral edge 16 of the ophthalmic lens 10, a more precise scan is needed to accurately find the drill feature. For this case, the number of points of measurement is increased, because for discontinuities in the outer peripheral edge 16 of the lens 10, such as drill notches and screw holes, it is necessary to know more precisely where the lens edge becomes discontinuous (so that machine 20 can stop dosing fluid onto the lens edge exactly at the drill notch).

The following describes the most important steps of the measuring process. Please note that not all of these features are mandatory for all lens edge profiles and might change accordingly:

a) projected laser line from the laser beam transmitter is normal to the outer peripheral edge of the ophthalmic lens to avoid shading at corners and reflection away from the laser sensor, especially for rectangular lenses with high width/length ratio; and b) tilting the ophthalmic lens towards the laser scanner unit when slope between segments differ significantly to catch light reflected away from the lens edge (especially on small segments).

Therefore, the machine 20 of the present invention generates an accurate 3D-profile of an outer peripheral edge of any given ophthalmic lens for subsequent processing. The ophthalmic lens 10 is held by the lens holder unit 24 into the projected laser line 41 of the laser scanner unit 26. The laser scanner unit 26 uses the laser triangulation principle for two-dimensional profile detection on the outer edge 16 of the ophthalmic lens 10.

Moreover, eyeglass consumers often request treatments of ophthalmic lens 10 to enhance the functionality and appeal (fashion) of their glasses. These lens treatments may involve coating the outer edge 16 of the ophthalmic lens 10. In order to apply the coating properly, the lens edge profile around the lens perimeter must be known with high accuracy to:
- position the liquid dispensing unit 28 correctly and accurately at a predetermined distance relative to the outer peripheral edge 16 of the ophthalmic lens 10;
- calculate the correct dosing amount for any specific location around the perimeter of the ophthalmic lens 10 (avoid over- or under-dosing of the coating liquid substance);
- avoid any collisions between the liquid dispensing unit 28 and the outer edge 16 of the ophthalmic lens 10.

In this specific use case, a dosing needle of the liquid dispensing unit 28 must be positioned normal to the outer peripheral edge 16 of the ophthalmic lens 10 with a very high degree of accuracy, such as +/−20 microns, and the amount of dosed liquid must be calculated, taking into account rheological properties of the dosing liquid, based also on size of the outer peripheral edge 16 of the ophthalmic lens 10 at a specific location. The outer peripheral edge 16 of the ophthalmic lens 10 is usually coated along segments of the lens edge. The coat needs to be regular and in a very specific thickness range: not too thin for durability and cosmetic reasons, and not too thick for curability, inserting lens into the eyeglass frame). The path of the liquid dispensing unit 28 and dosing parameters determine the thickness and position of the coating, depending on the lens edge type and the width of the segments on the outer peripheral edge 16. The correct distance between the dosing needle and the outer peripheral edge 16 is important to avoid uneven surfaces and lines in the coating as well as to avoid uncoated areas. The segment width and profile and exact position are the base for the amount of fluid dosed and the positioning of each line of coating. This avoids uneven surfaces as well as uncoated parts on the outer peripheral edge 16. Other use cases could be considered as well.

After the step of coating the outer peripheral edge 16 of the ophthalmic lens 10 with the appropriate liquid substance is complete, the UV light curing unit 30 may be positioned adjacent to the coated outer peripheral edge 16 of the ophthalmic lens 10 and activated to cure the liquid substance applied to the outer peripheral edge 16 of the ophthalmic lens 10.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A machine for processing an edge profile of an ophthalmic lens, the ophthalmic lens including first and second opposite optical surfaces and an outer peripheral edge defined therebetween, the machine defined by mutually perpendicular X, Y and Z axes, the machine comprising:
   a machine frame;
   a lens holder unit for selectively holding the ophthalmic lens;
   a laser scanner unit for determining a profile of the outer peripheral edge of the ophthalmic lens mounted to the lens holder unit; and
   a main controller operatively connected to each of the lens holder unit and the laser scanner unit for controlling and operating the lens holder unit and the laser scanner unit;
   each of the lens holder unit and the laser scanner unit mounted to the machine frame;
   the lens holder unit moveable relative to the machine frame between a home position holding the ophthalmic lens away from the laser scanner unit, and a working position positioning the ophthalmic lens adjacent the laser scanner unit;
   the lens holder unit configured to selectively rotate the ophthalmic lens around a C-axis of the lens holder unit, tilt the ophthalmic lens relative to the laser scanner unit and move rectilinearly relative to the machine frame in the Y axis;
   the laser scanner unit selectively moveable rectilinearly relative to the machine frame in the directions of the X and Z axes.

2. The machine as defined in claim 1, wherein the laser scanner unit includes a laser beam transmitter configured to emit a diffused laser beam outwardly from the laser scanner unit and a laser sensor configured to receive a laser reflection from the outer peripheral edge of the ophthalmic lens.

3. The machine as defined in claim 1, wherein the main controller operates the lens holder unit and the laser scanner unit so that the diffused laser beam emitted from the laser beam transmitter is oriented normal to the outer peripheral edge of the ophthalmic lens during the operation of the laser scanner unit.

4. The machine as defined in claim 1, wherein the lens holder unit includes a support chuck and a hold-down chuck, wherein the hold-down chuck is selectively rectilinearly moveable toward and away from the support chuck, and wherein the support chuck and the hold-down chuck are coaxial.

5. The machine as defined in claim 1, wherein the main controller configured to rotate the lens holder unit and operate the laser scanner unit to scan the lens at a first predetermined number of points to obtain a rough lens scan, and to rotate the lens holder unit and operate the laser scanner unit to scan the lens at a second predetermined number of points exceeding the first number of predetermined points to obtain a fine lens scan.

6. The machine as defined in claim 1, further comprising a liquid dispensing unit moveably mounted to the machine frame, wherein the liquid dispensing unit is configured to apply liquid coating to at least a portion of the outer peripheral edge of an ophthalmic lens.

7. The machine as defined in claim 6, wherein the main controller is operatively connected to the liquid dispensing unit for controlling and operating the liquid dispensing unit, and wherein the main controller is configured to position the liquid dispensing unit a predetermined distance relative to the outer peripheral edge of the ophthalmic lens based on the profile of the outer peripheral edge of the ophthalmic lens determined by the laser scanner unit and to determine an amount of liquid applied to the outer peripheral edge of the ophthalmic lens.

8. The machine as defined in claim 6, further comprising a UV light curing unit mounted to the machine frame and configured to cure the liquid applied to the outer peripheral edge of the ophthalmic lens.

9. The machine as defined in claim 8, wherein the main controller is operatively connected to the UV light curing unit for controlling and operating the UV light curing unit.

10. The machine as defined in claim 5, wherein the main controller is configured to space the measuring points selectively around the periphery of the lens.

11. The machine of claim 10, wherein the main controller spaces the measurement points a first distance around low curvature portions of the periphery and a second distance around high curvature portions of the periphery, the first distance exceeding the second distance.

12. The machine of claim 10, wherein the main controller spaces the measurement points to recognize discontinuities in the outer peripheral edge of the lens.

13. The machine as defined in claim 1, wherein the machine has five axes of freedom.

14. The machine of claim 1, wherein the lens holder unit includes a stepper motor operatively connected to the main controller for selectively rotating the lens during measurement and liquid application.

15. A method for processing an edge profile of an ophthalmic lens, the ophthalmic lens including first and second opposite optical surfaces and an outer peripheral edge defined therebetween, the method comprising the steps of:
securing an ophthalmic lens to a lens holder unit;
positioning the ophthalmic lens in a working position adjacent a laser scanner unit;
conducting a lens scan by the laser scanner unit including directing a diffused laser beam projected from the laser scanner unit onto a continuous outer peripheral edge of an ophthalmic lens from the laser scanner unit;
sensing a reflected laser beam from the outer peripheral edge by the laser scanner unit; and
determining an edge profile of the outer peripheral edge of the ophthalmic lens,
wherein the lens holder unit selectively rotates the ophthalmic lens around a C axis of the lens holder unit, tilts the ophthalmic lens relative to the laser scanner unit around a B axis and moves rectilinearly relative to the machine frame in the directions of the Y axis, and
wherein the laser scanner unit moves selectively rectilinearly relative to the machine frame in the directions of the X and Z axes.

16. The method as defined in claim 15, wherein the laser scanner unit is moveable rectilinearly toward and away from the outer peripheral edge so as to position the laser scanner unit at a measuring distance from the outer peripheral edge and within a measurement field.

17. The method as defined in claim 16, wherein the step of conducting the lens scan by the laser scanner unit includes:
conducting an initial lens scan to acquire an approximate edge profile of the outer peripheral edge of the ophthalmic lens by the laser scanner unit while rotating and tilting the ophthalmic lens by the lens holder unit to scan the ophthalmic lens at a first predetermined number of points of measurement; and
conducting a main lens scan based on the approximate edge profile acquired during the initial lens scan to acquire an accurate edge profile of the outer peripheral edge of the ophthalmic lens by the laser scanner unit while rotating and tilting the ophthalmic lens by the lens holder unit to scan the ophthalmic lens at a second predetermined number of points of measurement exceeding the first number of predetermined points of measurement.

18. The method as defined in claim 17, wherein the initial lens scan is conducted by directing the diffused laser beam projected from the laser scanner unit onto the outer peripheral edge of the ophthalmic lens, sensing the reflected laser beam from the outer peripheral edge by the laser scanner unit, and detecting the approximate edge profile of the ophthalmic lens.

19. The method as defined in claim 18, wherein the main lens scan is conducted by directing the diffused laser beam projected from the laser scanner unit onto the outer peripheral edge of the ophthalmic lens, rotating and tilting the ophthalmic lens with respect to the laser beam such that the laser beam projected onto the outer peripheral edge is normal to the outer peripheral edge, sensing the reflected laser beam from the outer peripheral edge by the laser scanner unit, and detecting the accurate edge profile of the ophthalmic lens.

20. The method as defined in claim 19, wherein the approximate edge profile is obtained by scanning the lens periphery with the laser scanner unit at N1 initial points of measurement, wherein the accurate edge profile is obtained by scanning the lens periphery with the laser scanner unit at N2 main points of measurement, and wherein the number N2 of the main points of measurement is larger than the number N1 of the initial points of measurement.

21. The method as defined in claim 15, wherein the laser scanner unit includes a laser beam transmitter configured to emit a diffused laser beam outwardly from the laser scanner unit and a laser sensor configured to receive a laser reflection from the outer peripheral edge of the ophthalmic lens.

22. The method as defined in claim 15, wherein the lens holder unit includes a support chuck and a hold-down chuck, which is selectively rectilinearly moveable toward and away from the support chuck, wherein the support chuck and the hold-down chuck are coaxial to one another, and wherein the step of securing the ophthalmic lens in the lens holder unit includes clamping the ophthalmic lens between the support chuck and the hold-down chuck.

23. The method as defined in claim 15, further including the step of applying a liquid coating to at least a portion of the outer peripheral edge of the ophthalmic lens following the step of detecting the edge profile of the outer peripheral edge of the ophthalmic lens.

24. The method as defined in claim 23, further including the step of curing the liquid coating applied to the outer peripheral edge of the ophthalmic lens.

25. A machine for application of liquid to an edge profile of an ophthalmic lens, the ophthalmic lens including first and second opposite optical surfaces and a continuous outer peripheral edge defined therebetween, the machine defined by mutually perpendicular X, Y and Z axes, the machine comprising:
- a machine frame;
- a lens holder unit for selectively clamping the ophthalmic lens;
- a laser scanner unit for determining a profile of the outer peripheral edge of the ophthalmic lens mounted to the lens holder unit;
- a liquid dispensing unit moveably mounted to the machine frame and is configured to apply liquid coating to at least a portion of the outer peripheral edge of an ophthalmic lens;
- a UV light curing unit mounted to the machine frame and configured to cure the liquid applied to the outer peripheral edge of the ophthalmic lens based on the profile of the outer peripheral edge of the ophthalmic lens determined by the laser scanner unit; and
- a main controller operatively connected to each of the lens holder unit, the laser scanner unit, the liquid dispensing unit and the UV light curing unit for controlling and operating the lens holder unit, the laser scanner unit, the liquid dispensing unit and the UV light curing unit;
- the lens holder unit moveable relative to the machine frame between a home position holding the ophthalmic lens away from the laser scanner unit, and a working position positioning the ophthalmic lens adjacent the laser scanner unit;
- the lens holder unit configured to selectively rotate the ophthalmic lens around a C axis of the lens holder unit, tilt the ophthalmic lens relative to the laser scanner unit around a B axis and move rectilinearly relative to the machine frame in the directions of the Y axis;
- the laser scanner unit selectively moveable rectilinearly relative to the machine frame in the directions of the X and Z axes.

26. The machine as defined in claim 25, wherein the liquid dispensing unit and the UV light curing unit are selectively moveable rectilinearly relative to the machine frame in the directions of the X and Z axes.

27. The machine as defined in claim 25, wherein the laser scanner unit includes a laser beam transmitter configured to emit a diffused laser beam and a laser sensor is configured to receive a laser reflection from the outer peripheral edge of the ophthalmic lens.

28. The machine as defined in claim 25, wherein the main controller operates the lens holder unit and the laser scanner unit so that the diffused laser beam emitted from the laser beam transmitter is oriented normal to the outer peripheral edge of the ophthalmic lens during the operation of the laser scanner unit.

29. The machine as defined in claim 25, wherein the lens holder unit includes a support chuck and a hold-down chuck, wherein the hold-down chuck is selectively rectilinearly moveable toward and away from the support chuck, and wherein the support chuck and the hold-down chuck are coaxial.

30. The machine as defined in claim 25, wherein the main controller configured to rotate and tilt the lens holder unit and operate the laser scanner unit to scan the lens at a first predetermined number of points to obtain a rough lens scan, and to rotate and tilt the lens holder unit and operate the laser scanner unit to scan the lens at a second predetermined number of points exceeding the first number of predetermined points to obtain a fine lens scan.

31. The machine as defined in claim 25, wherein the liquid dispensing unit is configured to apply liquid coating to at least a portion of the outer peripheral edge of an ophthalmic lens.

32. The machine as defined in claim 31, wherein the main controller is operatively connected to the liquid dispensing unit for controlling and operating the liquid dispensing unit, and wherein the main controller is configured to position the liquid dispensing unit a predetermined distance relative to the outer peripheral edge of the ophthalmic lens based on the profile of the outer peripheral edge of the ophthalmic lens determined by the laser scanner unit and to determine an amount of liquid applied to the outer peripheral edge of the ophthalmic lens.

33. The machine as defined in claim 31, wherein the UV light curing unit is mounted to the machine frame and configured to cure the liquid applied to the outer peripheral edge of the ophthalmic lens.

34. The machine as defined in claim 33, wherein the main controller is operatively connected to the UV light curing unit for controlling and operating the UV light curing unit.

* * * * *